United States Patent
Jeong

(10) Patent No.: US 11,763,535 B2
(45) Date of Patent: Sep. 19, 2023

(54) ELECTRONIC DEVICE AND CONTROL METHOD THEREOF

(71) Applicant: SAMSUNG ELECTRONICS CO., LTD., Suwon-si (KR)

(72) Inventor: Jaeyun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/286,879

(22) PCT Filed: Aug. 23, 2019

(86) PCT No.: PCT/KR2019/010783
§ 371 (c)(1),
(2) Date: Apr. 20, 2021

(87) PCT Pub. No.: WO2020/105847
PCT Pub. Date: May 28, 2020

(65) Prior Publication Data
US 2021/0335052 A1 Oct. 28, 2021

(30) Foreign Application Priority Data

Nov. 23, 2018 (KR) ........................ 10-2018-0146671
Mar. 29, 2019 (KR) ........................ 10-2019-0036882
Jun. 3, 2019 (KR) ........................ 10-2019-0065591

(51) Int. Cl.
*G06T 19/20* (2011.01)
*H04N 13/117* (2018.01)
(Continued)

(52) U.S. Cl.
CPC ............. *G06T 19/20* (2013.01); *G06V 20/36* (2022.01); *G06V 20/46* (2022.01); *H04N 13/117* (2018.05); *G06T 2219/2004* (2013.01)

(58) Field of Classification Search
None
See application file for complete search history.

(56) References Cited

U.S. PATENT DOCUMENTS 8,218,855 B2 7/2012 Kim et al.
8,606,645 B1 12/2013 Applefeld
(Continued)

FOREIGN PATENT DOCUMENTS

GB 2549723 A 11/2017
JP 4153761 B2 9/2008
(Continued)

OTHER PUBLICATIONS

Communication dated Nov. 22, 2021 by the European Patent Office for European Patent Application No. 19888021.3.
(Continued)

*Primary Examiner* — Yi Wang
(74) *Attorney, Agent, or Firm* — Sughrue Mion, PLLC

(57) ABSTRACT

An electronic device is provided. The electronic device includes: a display; a camera; a memory; and a processor configured to identify a video captured in real time through the camera as a plurality of image sections, obtain spatial information corresponding to each image section, map the obtained spatial information to each of the plurality of image sections and store same in the memory, and control the display to add a virtual object image to the video and display the same on the basis of the spatial information mapped to each of the plurality of image sections when a user command for adding the virtual object image to the video is input.

16 Claims, 21 Drawing Sheets

(51) Int. Cl.
*G06V 20/00* (2022.01)
*G06V 20/40* (2022.01)

(56) References Cited

U.S. PATENT DOCUMENTS

| | | | |
|---|---|---|---|
| 9,167,176 | B2 | 10/2015 | Winter et al. |
| 10,366,538 | B2 | 7/2019 | Meier et al. |
| 2012/0331416 | A1 | 12/2012 | Barcay et al. |
| 2013/0265392 | A1 | 10/2013 | Rhee et al. |
| 2014/0068439 | A1* | 3/2014 | Lacaze .................. G06F 16/444 715/720 |
| 2016/0381348 | A1 | 12/2016 | Hayasaka et al. |
| 2017/0109929 | A1 | 4/2017 | Meier et al. |
| 2017/0212585 | A1 | 7/2017 | Kim et al. |
| 2019/0005715 | A1 | 1/2019 | Tung et al. |

FOREIGN PATENT DOCUMENTS

| | | |
|---|---|---|
| JP | 2010-541054 A | 12/2010 |
| JP | 2015-39216 A | 2/2015 |
| KR | 10-2013-0131179 A | 12/2013 |
| KR | 10-1390811 B1 | 5/2014 |
| KR | 10-2016-0033495 A | 3/2016 |
| KR | 10-2016-0093769 A | 8/2016 |
| WO | 2017/203710 A1 | 11/2017 |

OTHER PUBLICATIONS

International Search Report dated Dec. 18, 2019 issued by the International Searching Authority in International Application No. PCT/KR2019/010783 (PCT/ISA/210).
International Written Opinion dated Dec. 18, 2019 issued by the International Searching Authority in International Application No. PCT/KR2019/010783 (PCT/ISA/237).
Communication dated Apr. 5, 2022 issued by the European Patent Office in European Application No. 19888021.3.
Communication dated Feb. 16, 2023 by the European Patent Office in European Application No. 19888021.3.
Communication dated May 22, 2023 by the Korean Intellectual Property Office in Korean Patent Application No. 10-2019-0065591.

* cited by examiner

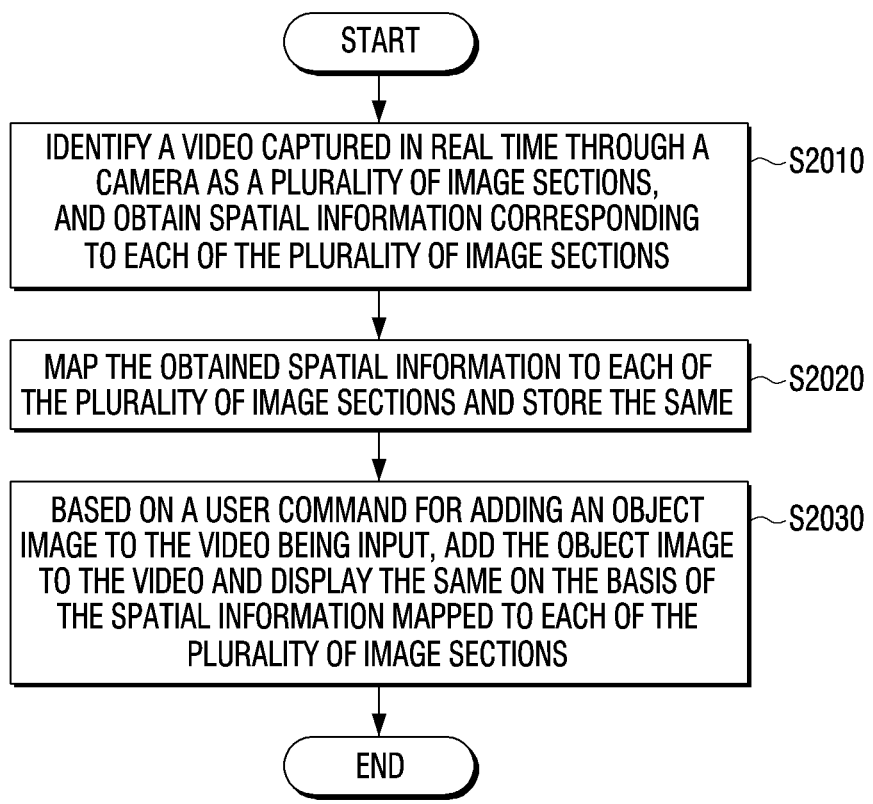

ELECTRONIC DEVICE AND CONTROL METHOD THEREOF

TECHNICAL FIELD

The disclosure relates to an electronic device and a control method thereof, and more particularly, to an electronic device that provides a virtual object image, and a control method thereof.

DESCRIPTION OF THE RELATED ART

As electronic technologies are being developed, various types of electronic devices are being developed and distributed.

In particular, as portable devices having a photographing function such as smartphones, tablet PCs, etc. are being developed and distributed, research and development for an augmented reality (AR) function and use thereof are increasing.

Augmented reality may be a technology of adding a virtual object to a real object (e.g., a real environment, a real object) and providing the object.

However, in conventional methods, a virtual object is just added to an image that is photographed in real time, and there is a problem that the same experience as augmented reality cannot be provided to a user for an image photographed in a different place.

Accordingly, there is a need that an augmented reality image should be provided to a user, which makes a user interaction possible for a virtual object in an augmented reality image without a limitation on a place.

DETAILED DESCRIPTION OF THE INVENTION

Technical Problem

The disclosure was devised for addressing the aforementioned need, and the purpose of the disclosure is in providing an electronic device that adds a virtual object based on information on a space included in a photographed image, and a control method thereof.

Technical Solution

An electronic device according to an embodiment of the disclosure for achieving the aforementioned purpose includes a display, a camera, a memory, and a processor configured to identify a video captured in real time through the camera as a plurality of image sections, and obtain spatial information corresponding to each image section, map the obtained spatial information to each of the plurality of image sections and store the same in the memory, and based on a user command for adding a virtual object image to the video being input, control the display to add the virtual object image to the video and display the same on the basis of the spatial information mapped to each of the plurality of image sections.

Here, the processor may obtain information on a plane space and information on a view direction of the camera in each of the plurality of image sections and store the same as the spatial information, obtain location information for adding the virtual object image on the basis of the information on the plane space in each of the plurality of image sections, obtain a virtual object image in a shape corresponding to the information on the view direction of the camera, and control the display to add the obtained virtual object image to a corresponding image section and display the same on the basis of the location information.

Here, the processor may store information on at least one of a location or a pose of the camera obtained through at least one of an acceleration sensor or a gyro sensor as the information on the view direction of the camera.

Also, the processor may, based on a plurality of location information for adding the virtual object image on the basis of the spatial information obtained in at least one section among the plurality of image sections being obtained, identify one of the plurality of location information on the basis of history information that a virtual object image was previously added to the video.

In addition, the processor may obtain a video wherein the order of the plurality of image sections was rearranged on the basis of the information on the view direction of the camera obtained in each of the plurality of image sections, and control the display to display a navigation bar for adjusting a time point of reproducing the obtained video together with the obtained video.

Here, the processor may rearrange the order of the plurality of image sections such that the view direction of the camera moves from a first direction to a second direction on the basis of the information on the view direction of the camera.

Also, the electronic device includes a communicator, and the processor may control the communicator to transmit the plurality of image sections and spatial information mapped to each of the plurality of image sections stored in the memory to an external device.

Here, the processor may, based on a video to which another virtual object image was added on the basis of the plurality of image sections and the spatial information mapped to each of the plurality of image sections being received from the external device, control the display to replace the virtual object image with the another virtual object image included in the received video and display the same.

Also, the virtual object image may be a virtual object image corresponding to the spatial information among a plurality of virtual object images which captured a 3D object image in different directions or different distances.

In addition, the processor may, based on a user command for at least one of change of the location or rotation of the virtual object image included in the displayed video being input, obtain at least one of direction information or distance information corresponding to the user command, obtain a virtual object image corresponding to the user command among the plurality of virtual object images on the basis of the obtained information and control the display to display the same.

Further, the processor may obtain information on an object included in each of the plurality of image sections and store the same as the spatial information, obtain location information for adding the virtual object image to one area of the object on the basis of the information on the object in each of the plurality of image sections, and obtain the virtual object image in a shape corresponding to the information on the view direction of the camera, and control the display to add the obtained virtual object image to a corresponding image section and display the same on the basis of the location information.

Also, the processor may obtain information on an object included in each of the plurality of image sections and shape information of a space wherein the object is located and store the same as the spatial information, and based on a user command for replacing the object with the virtual object being input, overlap the virtual object image with the object on the basis of the information on the object and the shape information of the space and display the same.

In addition, the processor may apply the video to a learning network model and obtain information on an object included in each of the plurality of image sections, and the information on the object may include at least one of the type, the shape, the size, or the location of the object.

Further, the processor may, based on a user command for adding another virtual object image to one area of the virtual object image being input, control the display to display the another virtual object image in a form of being laminated on the virtual object image on the basis of information on the virtual object image.

Also, the processor may, based on a command for removing the virtual object image being input, remove the virtual object image, and control the display to display the another virtual object image in the location wherein the virtual object image was removed.

In addition, the processor may control the display to display a UI including at least one module image on the basis of information on a subject electronic device, obtain the virtual object image corresponding to a module-type electronic device obtained on the basis of a module image selected by a user input among the at least one module, and add the virtual object image to the video.

Here, the processor may, based on a user command for changing at least one of the size, the arrangement form, the color, or the material of at least one module image included in the virtual object image being received, change the virtual object image on the basis of the user command.

Meanwhile, a control method of an electronic device according to an embodiment of the disclosure includes the steps of identifying a video captured in real time through a camera as a plurality of image sections, and obtaining spatial information corresponding to each image section, mapping the obtained spatial information to each of the plurality of image sections and storing the same, and based on a user command for adding an object image to the video being input, adding the object image to the video and displaying the same on the basis of the spatial information mapped to each of the plurality of image sections.

Here, the step of storing includes the steps of obtaining information on a plane space and information on a view direction of the camera in each of the plurality of image sections and storing the information on the plane space and the information on the view direction as the spatial information, and the step of displaying includes the steps of obtaining location information for adding the object image on the basis of the information on the plane space in each of the plurality of image sections, obtaining an object image in a shape corresponding to the information on the view direction of the camera, and adding the obtained object image to a corresponding image section and displaying the same on the basis of the location information.

Here, in the step of obtaining, information on at least one of a location or a pose of the camera obtained through at least one of an acceleration sensor or a gyro sensor of the electronic device may be obtained as the information on the view direction.

Also, the step of displaying may include the step of, based on a plurality of location information for adding the object image on the basis of the spatial information obtained in at least one section among the plurality of image sections being obtained, identifying one of the plurality of location information on the basis of history information that an object image was previously added to the video.

In addition, the control method includes the step of obtaining a video wherein the order of the plurality of image sections was rearranged on the basis of the information on the view direction obtained in each of the plurality of image sections, and in the step of displaying, a navigation bar for adjusting a time point of reproducing the obtained video may be displayed together with the obtained video.

Here, in the step of obtaining a rearranged video, the order of the plurality of image sections may be rearranged such that the view direction of the camera moves from a first direction to a second direction on the basis of the information on the view direction.

Also, the control method may include the step of transmitting the plurality of image sections and spatial information mapped to each of the plurality of image sections to an external device.

In addition, the step of displaying may include the step of, based on a video to which another object image was added on the basis of the plurality of image sections and the spatial information mapped to each of the plurality of image sections being received from the external device, replacing the object image with the another object image included in the received video and displaying the same.

Further, the object image may be an object image corresponding to the spatial information among a plurality of object images which captured a 3D object image in different directions or different distances.

Here, the step of displaying may include the steps of, based on a user command for at least one of change of the location or rotation of the object image included in the video being input, obtaining at least one of direction information or distance information corresponding to the user command, and obtaining an object image corresponding to the user command among the plurality of object images on the basis of the obtained information and displaying the same.

Effect of the Invention

According to the various embodiments of the disclosure, a user can be provided with a video to which a virtual AR object was added without a limitation on a place, and can make an interaction for the object. Also, a user can share an augmented reality image wherein addition and modification of an AR object are possible without limitations on a place and time with another user.

BRIEF DESCRIPTION OF DRAWINGS

FIG. 20 is a flow chart for illustrating a control method of an electronic device according to an embodiment of the disclosure.

BEST MODE FOR IMPLEMENTING THE INVENTION

Mode for Implementing the Invention

Figure 1:
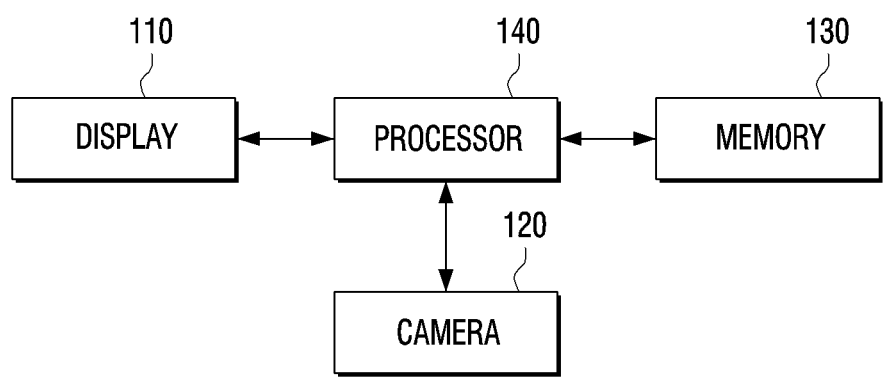
FIG. 1 is a block diagram illustrating a configuration of an electronic device according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there are terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

In this specification, expressions such as "have," "may have," "include," and "may include" should be construed as denoting that there are such characteristics (e.g.: elements such as numerical values, functions, operations, and components), and the expressions are not intended to exclude the existence of additional characteristics.

Also, the expression "at least one of A and/or B" should be interpreted to mean any one of "A" or "B" or "A and B."

In addition, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, unless defined obviously differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

Meanwhile, in this specification, the term "user" may refer to a person who uses an electronic device or a device using an electronic device (e.g.: an artificial intelligence electronic device).

Hereinafter, an embodiment of the disclosure will be described in more detail with reference to the accompanying drawings.

FIG. 1 is a block diagram illustrating a configuration of an electronic device according to an embodiment of the disclosure.

The electronic device 100 may be implemented as a device equipped with a display function, such as a TV, a smartphone, a tablet PC, a PMP, a PDA, a laptop PC, a smart watch, a head mounted display (HMD), a near eye display (NED), etc. The electronic device 100 may include displays in various forms for providing a display function.

However, various embodiments according to the disclosure can be implemented through electronic devices not equipped with a display function. For example, electronic devices in various types that provide an image to an external device such as a blue ray player, a digital versatile disc (DVD) player, a streaming content output device, a set-top box, etc. can implement various embodiments of the disclosure. As another example, home appliances in various forms such as a speaker, a refrigerator, a washing machine, an air conditioner, an air purifier, various Internet of Things devices, etc. can obviously implement various embodiments of the disclosure. Hereinafter, for the convenience of explanation, explanation will be made based on the assumption that the electronic device 100 is a user terminal device provided with a camera 120.

Referring to FIG. 1, the electronic device 100 includes a display 110, a camera 120, a memory 130, and a processor 140.

The display 110 may provide various content screens that can be provided through the electronic device 100. Here, a content screen may include various contents such as an image, a moving image, a text, music, etc., an application execution screen, a graphic user interface (GUI) screen, etc.

The display 110 may be implemented as displays in various forms such as a liquid crystal display (LCD), an organic light emitting diodes (OLED) display, a plasma display panel (PDP), a wall, micro LEDs, etc. Inside the display 110, driving circuits that may be implemented in forms such as an a-si TFT, a low temperature poly silicon (LTPS) TFT, an organic TFT (OTFT), a backlight unit, etc. may also be included together. Meanwhile, the display 110 may also be implemented as a touch screen combined with a touch sensor, a flexible display, a 3D display, etc.

Also, the display 110 according to an embodiment of the disclosure may include not only a display panel outputting images, but also a bezel housing the display panel. In particular, the bezel according to an embodiment of the disclosure may include a touch sensor (not shown) for detecting user interactions.

In particular, the display 110 may display a video captured in real time through the camera 120 (e.g., a live view image), an augmented reality (AR) image to which a virtual object image was added to the image, or an image obtained by the processor 140 based on the image as will be described below, etc. according to control by the processor 140. Here, a virtual object image may be referred to as an AR object, a virtual object, etc., but hereinafter, it will be generally referred to as a virtual object image for the convenience of explanation.

The electronic device 100 according to an embodiment of the disclosure may include at least one camera 120 on its front surface or rear surface.

The camera 120 is a device that can capture a still image or a moving image, and it may include one or more image sensors (e.g., a front surface sensor or a rear surface sensor), a lens, an image signal processor (ISP), and a flash (e.g., LEDs, a xenon lamp, etc.).

The camera 120 according to an embodiment of the disclosure may capture any subject according to control by the processor 140, and transmit the captured data to the processor 140. The captured data can obviously be stored in the memory 130 according to control by the processor 140. Here, the captured data may be called in various ways such as a picture, an image, a still image, a moving image, etc., but hereinafter, it will be generally referred to as an image for the convenience of explanation. Meanwhile, it is obvious that images according to various embodiments of the disclosure can mean images received from an external device and an external server, images stored in the memory 130, etc., other than live view images captured through the camera 120.

According to an embodiment of the disclosure, the processor 140 may display an augmented reality screen based on a video captured through the camera 120 through the display 110.

The memory 130 stores various data such as an operating system (O/S) software module for operating the electronic device 100, various kinds of multimedia contents, etc.

In particular, the memory 130 may store various kinds of information obtained from a video captured through the camera 120 according to control by the processor 140. Detailed explanation regarding various kinds of information stored in the memory 130 will be made later.

The processor 140 may be implemented as a digital signal processor (DSP) processing digital signals, a microprocessor, and a time controller (TCON). However, the disclosure is not limited thereto, and the processor 140 may include one or more of a central processing unit (CPU), a micro controller unit (MCU), a micro processing unit (MPU), a controller, an application processor (AP), a graphics-processing unit (GPU), or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA). The processor 140 may perform various functions by executing computer executable instructions stored in the memory.

The processor 140 according to an embodiment of the disclosure may identify a video captured in real time through the camera 120 as a plurality of image sections. Explanation in this regard will be made with reference to FIG. 3.

Figure 3:
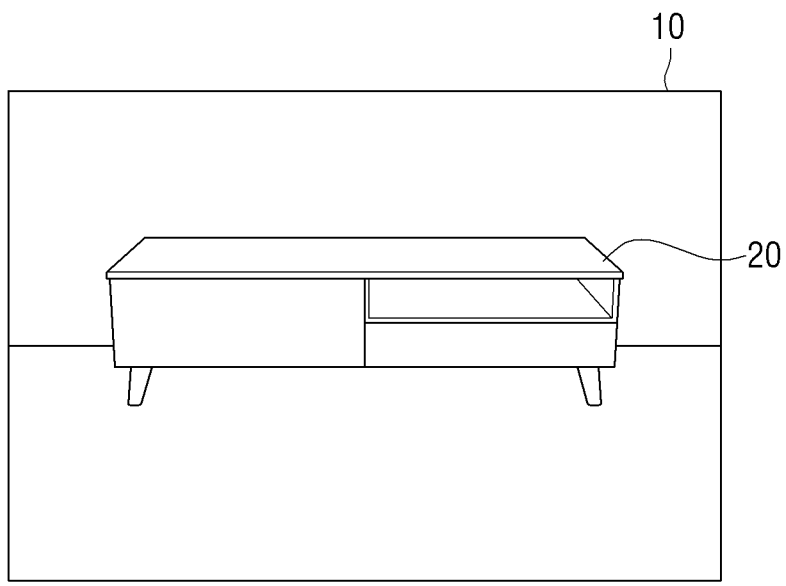
FIG. 3 is a diagram for illustrating a video captured through a camera according to an embodiment of the disclosure.
Figure 3:
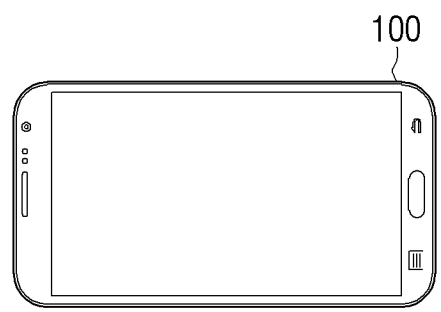

FIG. 3 is a diagram for illustrating a video captured through a camera according to an embodiment of the disclosure.

Referring to FIG. 3, the camera 120 may capture a real object according to control by the processor 140, and transmit it to the processor 140. Here, a real object (e.g., furniture, a home appliance, a wall surface, a background, etc.) may mean a subject.

The processor 140 according to an embodiment of the disclosure may display a video 10 captured in real time through the camera 120 through the display 110. Also, the processor 140 can obviously store the video 10. Then, the processor 140 may identify the video 10 as a plurality of image sections.

Here, the image sections may mean sections that divided the video 10 by at least one of a single frame, frames in a predetermined number, or by a predetermined time. As an example, the processor 140 may divide the video 10 in frame units in a predetermined number and obtain first to nth image sections. The predetermined number may be set in various ways. For example, the processor 140 may identify image sections in 24, 30, or 60 frame units. However, this is merely an example, and the disclosure is not necessarily limited thereto.

As another example, the processor 140 may divide the video 10 in predetermined time units and obtain first to nth image sections. For example, the processor 140 may identify image sections in units of 10 seconds. If the video 10 is 60 frames per second (fps), the processor 140 may divide the video 10 in 600 frame units and obtain first to nth image sections. However, this is merely an example, and the disclosure is not necessarily limited thereto.

The processor 140 according to an embodiment of the disclosure may obtain spatial information corresponding to an image section. Here, the spatial information may mean information on a plane space and information on a view direction of the camera in an image section. Spatial information corresponding to an image section will be described with reference to FIG. 4.

Figure 4:
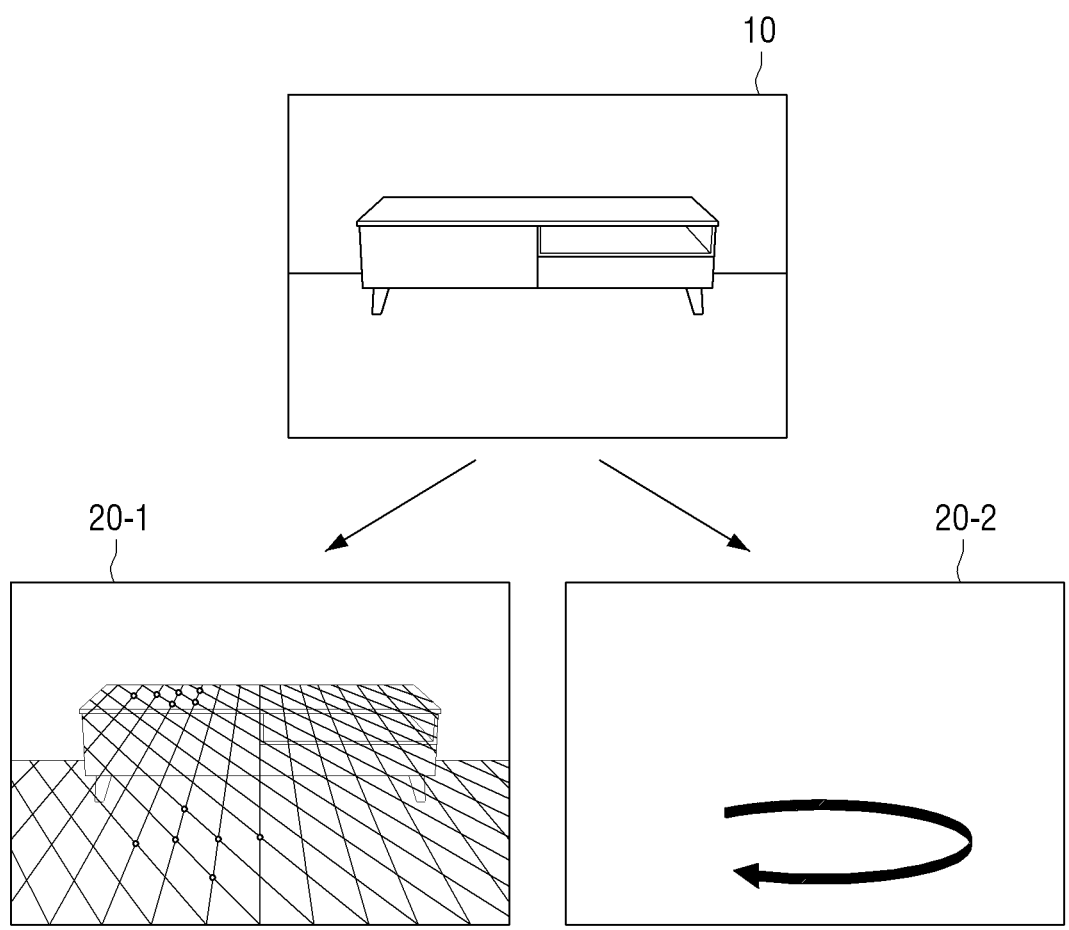
FIG. 4 is a diagram for illustrating spatial information according to an embodiment of the disclosure.

FIG. 4 is a diagram for illustrating spatial information according to an embodiment of the disclosure.

The processor 140 according to an embodiment of the disclosure may obtain information on a plane space 20-1 and information on a view direction 20-2 of the camera 120 in an image section and store the same as spatial information 20.

The processor 140 according to an embodiment of the disclosure may assume a plane space in an image section. For example, according to spatial coherency, a plurality of points constituting a plane space may exist while being adjacent to one another. The processor 140 may assume a plane space in an image section by using any points adjacent to one another. The processor 140 may identify whether any points adjacent to one another exist on the same plane, and obtain information on a plane space 20-1 based on the identification result.

For example, the processor 140 may identify whether a specific space in an image section is a plane space by using first to three points adjacent to one another (or, spaced within a threshold value). If a specific space is a plane space according to the identification result, the processor 140 may obtain coefficients A, B, C, and D of a plane equation based on the first to three points. The processor 140 may obtain a plane equation as information on a plane space 20-1 based on the following formula 1.

$$Ax+By+Cz+D=0 \quad \text{Formula 1}$$

Here, A, B, and C are normal vectors indicating the direction of the plane, and D may be a distance between the plane including the first to three points and the camera 120. However, this is merely an example, and information on a plane space 20-1 may be in various forms. For example, it is obvious that the processor 140 can analyze an image section based on a machine-learned model that obtains feature information of an image, and obtain information on a plane space 20-1 according to the analysis result.

The processor 140 according to an embodiment of the disclosure may obtain information on a view direction 20-2 of the camera 120 in an image section.

Information on a view direction (or a view angle) 20-2 of the camera 120 according to an embodiment of the disclosure may mean at least one of the direction that the camera 120 is toward, the angle of the camera 120, the location of the camera 120, or the pose of the camera 120 corresponding to a real-time video received from the camera 120. Referring to FIG. 4, it can be figured out that the camera 120 captured a subject while moving from the left to the right, and then from the right to the left again, and captured the subject in a specific angle or pose.

According to an embodiment of the disclosure, the electronic device 100 may include at least one of an acceleration sensor or a gyro sensor. According to an embodiment, the processor 140 may obtain a specific angle (e.g., 15 degrees among 360 degrees in all directions) corresponding to a view direction that the camera 120 is toward (or, the direction that the electronic device 100 is toward) among all directions (e.g., 360 degrees) based on a sensing result of at least one sensor as information on a view direction 20-2. Meanwhile, a specific angle obtained through a sensing result may be referred to as the pose, the tilting degree, etc. of the camera 120, but hereinafter, it will be generally referred to as the pose of the camera 120 for the convenience of explanation.

As another example, the processor 140 may obtain the current location of the electronic device 100 (or, the camera 120) as information on a view direction 20-2 based on a sensing result.

As still another example, the processor 140 may obtain a real object with the camera 120, obtain location information (e.g., latitude/longitude information) of the current location of the electronic device 100 through a sensor (e.g., a GPS sensor), and obtain sensor information such as tilting/gravity, etc. through at least one sensor.

Meanwhile, this is merely an example, and the disclosure is not limited thereto. For example, it is obvious that the electronic device 100 can obtain information on a view direction 20-2 of the camera 120 based on a GPS sensor, a location-based services (LBS) method, location information or direction information received from an external device, a digital compass, etc.

Returning to FIG. 1, the processor 140 according to an embodiment of the disclosure may map obtained spatial information to each of the plurality of image sections and store the same in the memory 130.

According to an embodiment of the disclosure, the processor 140 may identify a plane space that exists on the same line with the view direction of the camera 120 (e.g., the same direction, the same angle, or the same pose as the view that the camera 120 is toward), map information on the plane space 20-1 to the corresponding image section together with information on the view direction 20-2 of the camera 120, and store the same. Referring to FIG. 4, the processor 140 may map a specific video 10 with information on a plane space 20-1 and information on a view direction 20-2 of the camera 120 corresponding thereto and store the same. Meanwhile, FIG. 4 is illustrated based on the assumption that information on a view direction 20-2 is a moving direction of the gaze of the camera 120, but this is merely an example, and the disclosure is not limited thereto. For example, it is obvious that information on a view direction 20-2 can include coordinate information, point information, etc. of a subject that exists on the same line (or, a straight line) in the view direction of the camera 120 in a video.

If a user command for adding a virtual object image to the video 10 is input, the processor 140 according to an embodiment of the disclosure may add the virtual object image to the video based on spatial information mapped to each of the plurality of image sections and display the image through the display 110. Detailed explanation in this regard will be made with reference to FIG. 5.

Figure 5:
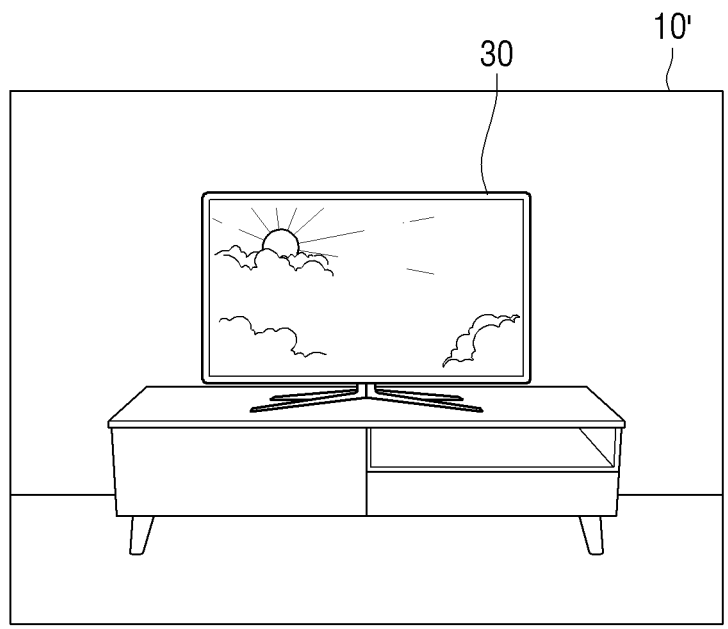
FIG. 5 is a diagram for illustrating an object image according to an embodiment of the disclosure.

FIG. 5 is a diagram for illustrating a virtual object image according to an embodiment of the disclosure.

Referring to FIG. 5, a virtual object image 30 selected by a user may be added to the video 10. Here, the virtual object image 30 may mean an image corresponding to a home appliance, furniture, etc. selected by a user. The processor 140 according to an embodiment of the disclosure may provide a list of virtual object images 30 that a user can add to the video 10, and add the virtual object image 30 corresponding to the user's command for selection in the list to the video 10. However, this is merely an example, and the disclosure is not limited thereto. For example, the processor 140 may display UIs in various forms (e.g., a search window, etc.) by which a user can select a specific object (e.g., a home appliance or furniture), and add the virtual object image 30 corresponding to the object selected according to the user's command to the video 10.

Referring to FIG. 5, the processor 140 may obtain information on a plane space 20-1 and information on a view direction 20-2 mapped to each of the plurality of image sections. Then, the processor 140 may obtain location information for adding the virtual object image 30 based on the information on a plane space 20-1 in each of the plurality of image sections. For example, the processor 140 may not overlay the virtual object image 30 on any area of the video 10, but add the virtual object image 30 to a plane space of a specific subject among a plurality of subjects inside the video 10 based on the information on a plane space 20-1. Here, a plane space of a specific object may mean the aforementioned location information.

Then, the processor 140 may obtain the virtual object image 30 in a shape corresponding to the information on a view direction 20-2. For example, the processor 140 may obtain the virtual object image 30 corresponding to the information on a view direction 20-2 among a plurality of virtual object images that captured a 3D virtual object image in different directions or different distances. As an example, if the virtual object image 30 corresponding to the view direction that the camera 120 is toward, the angle, or the pose is a right side surface diagram or a left side surface diagram of an object, the processor 140 may obtain a right side surface diagram or a left side surface diagram among the plurality of virtual object images 30 and add the diagram to the video 10. As another example, if the virtual object image 30 corresponding to the view direction that the camera 120 is toward, the angle, or the pose is a front surface diagram, the processor 140 may obtain a front surface diagram of an object as the virtual object image 30, and add the diagram to the video 10.

Specifically, the processor 140 according to an embodiment of the disclosure may obtain the virtual object image 30 based on a 3D virtual object image in a form of 3D mesh data. As a method of obtaining 3D mesh data, first, a plurality of meshes may be generated for an object modeled in 3D through scanning, etc. Then, a polygonal mesh may be generated for a face forming the surface of the 3D object shape. Here, a mesh refers to a closed structure including faces, nodes (vertexes), and edges. For example, a mesh may consist of a triangle, and it can also obviously consist of a polygon such as a quadrangle, a pentagon, etc. If the size or area of a mesh is given, about tens to tens of thousands of meshes may be formed automatically according to the modeled shape. Also, an object may be modeled into a 3D shape through such generation of meshes, and the virtual object image 30 corresponding to various view directions can be obtained by utilizing the 3D shape. The mesh data may include information that can express a mesh including faces, nodes (vertexes), and edges. For example, the mesh data may include coordinates of each node for one mesh, and if the processor 140 can figure out the coordinates of each node, the processor 140 may obtain the virtual object image 30 corresponding to an angle of viewing a 3D mesh model (e.g., a virtual object) by referring to the coordinates of each node. Also, the processor 140 may identify the form and the size of a 3D virtual object to be added to a video based on a 3D object image. As an example, the processor 140 may define a specific node in the 3D mesh data as the square one (0, 0, 0) of the absolute coordinate system, calculate the locations of each node, and identify the form and the size of a 3D virtual object. For example, as the distances among nodes become far, the absolute values of the coordinates of each node may increase, and the processor 140 may identify the form (or, the shape) and the size of a 3D virtual object based on the absolute values.

It is obvious that 3D mesh data as described above can be stored in the electronic device 100 in advance, or can be received by performing communication with a server, or can be generated in the electronic device 100 itself. The processor 140 may obtain the virtual object image 30 based on a view direction that the camera 120 is toward from 3D mesh data corresponding to a selected object. Meanwhile, a 3D virtual object image in a form of mesh data is merely an example, and the disclosure is not necessarily limited thereto. For example, it is obvious that the processor 140 can obtain the virtual object image 30 corresponding to a view direction of the camera 120 from a plurality of 2D images that captured an object in various directions and various distances, or obtain the virtual object image 30 corresponding to a view direction of the camera 120 based on a neural network algorithm that generates and outputs the virtual object image 30. Hereinafter, for the convenience of explanation, explanation will be made based on the assumption that a 3D virtual object image is in a form of mesh data.

Meanwhile, in FIG. 5, explanation was made based on the assumption that the processor 140 displays a video 10' which is an image wherein the virtual object image 30 was added to the video 10 captured in real time through the camera 120 through the display 110, but the disclosure is not necessarily limited thereto. For example, it is obvious that the processor 140 can display a video 10' which is an image wherein the virtual object image 30 was added to the video 10 based on spatial information 20 stored in the memory 130 in a place different from the place wherein the video 10 was captured.

The virtual object image 30 is not just overlayed on a specific area of the video 10 as in the conventional technology, but the processor 140 according to an embodiment of the disclosure may add the virtual object image 30 to the corresponding image section based on the image section and spatial information mapped to the image section stored in the memory 130.

Returning to FIG. 1, if a plurality of location information for adding the virtual object image 30 are obtained based on spatial information 20 obtained in at least one section among the plurality of image sections, the processor 140 may identify one of the plurality of location information based on history information that a virtual object image was previously added to the video 10. Detailed explanation in this regard will be made with reference to FIG. 6.

Figure 6:
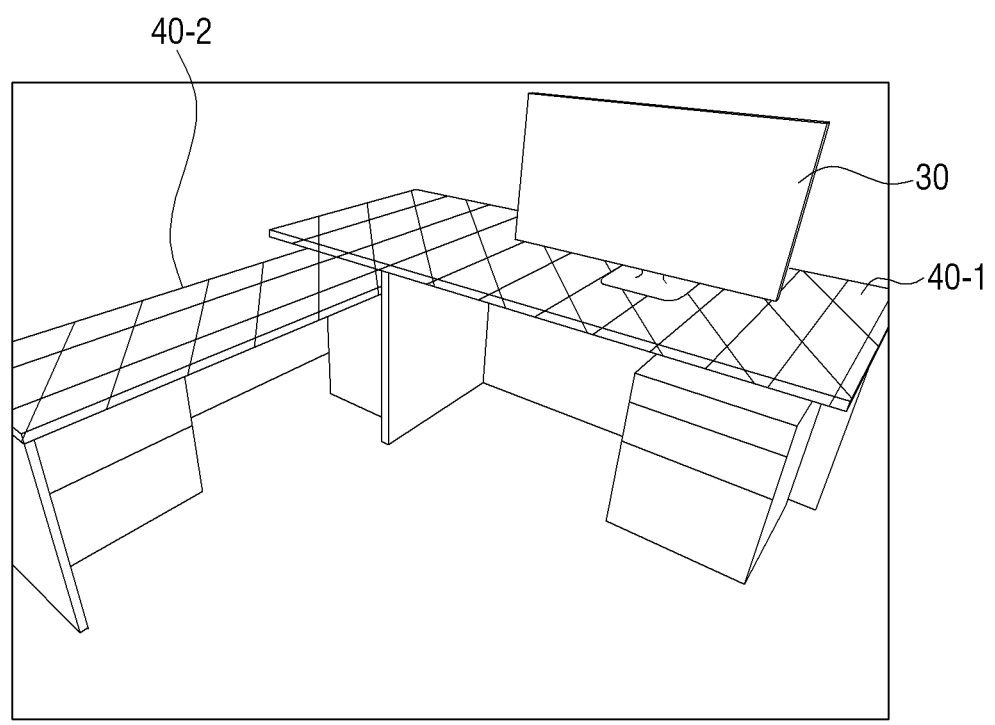
FIG. 6 is a diagram for illustrating a plurality of location information according to an embodiment of the disclosure.

FIG. 6 is a diagram for illustrating a plurality of location information according to an embodiment of the disclosure.

Referring to FIG. 6, the processor 140 may obtain location information for adding the virtual object image 30 based on location information on a plane space 20-1 in each of the plurality of image sections. For example, the processor 140 may identify a plurality of plane spaces in a video based on location information on a plane space 20-1, and identify a first plane space and a second plane space among the plurality of plane spaces as location information for adding the virtual object image 30. The processor 140 may add the virtual object image 30 to any one of the identified location information.

If a plurality of location information for adding the virtual object image 30 are obtained, the processor 140 according to an embodiment of the disclosure may identify any one of the plurality of location information based on history information that a virtual object image was previously added. Then, the processor 140 may add the virtual object image 30 to the identified location information.

Referring to FIG. 6, the processor 140 may identify a plane space on a first table as first location information 40-1, and identify a plane space on a second table as second location information 40-2 based on the location information on a plane space 20-1 in an image section. Then, the processor 140 may obtain any one location information wherein a virtual object image was previously added between the first and second location information 40-1, 40-2. For example, if there is history that an augmented reality screen wherein a virtual object image was previously added to the first table corresponding to the first location information 40-1 was displayed, the processor 140 may obtain the first location information 40-1 between the first and second location information 40-1, 40-2 based on such history information, and add the virtual object image 30 to the obtained first location information 40-1. Meanwhile, this is merely an example, and the disclosure is not limited thereto.

As another example, if a plurality of location information for adding the virtual object image 30 are identified based on the location information on a plane space 20-1 in an image section, the processor 140 may identify location information corresponding to a plane space of the biggest area among the plurality of location information. As still another example, the processor 140 may identify location information corresponding to a plane space located at a height greater than or equal to a threshold value based on the floor plane. Then, the processor 140 may add the virtual object image 30 to the identified location information.

Returning to FIG. 1, the processor 140 may obtain a video wherein the order of the plurality of image sections was rearranged based on information on a view direction 20-2 of the camera 120 obtained in each of the plurality of image sections, and display a navigation bar for adjusting a time point of reproducing the obtained video together with the video. Detailed explanation in this regard will be made with reference to FIG. 7 and FIG. 8.

Figure 7:
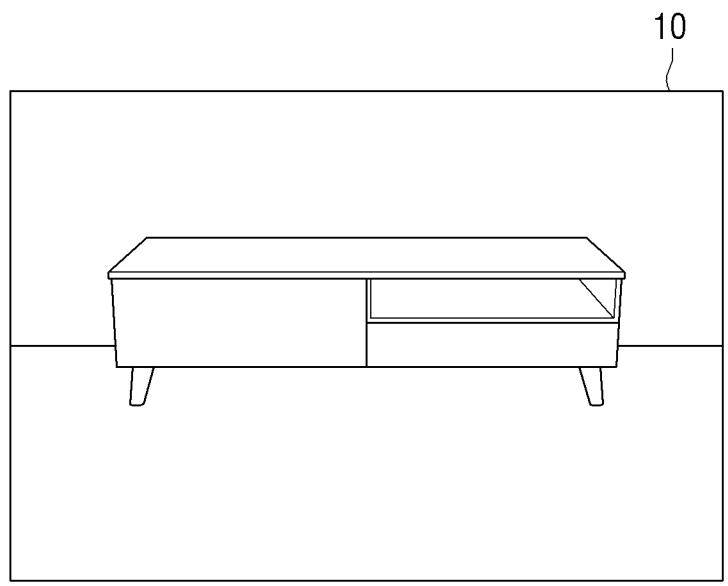
FIG. 7 is a diagram for illustrating information on a view direction of a camera according to an embodiment of the disclosure.
Figure 7:
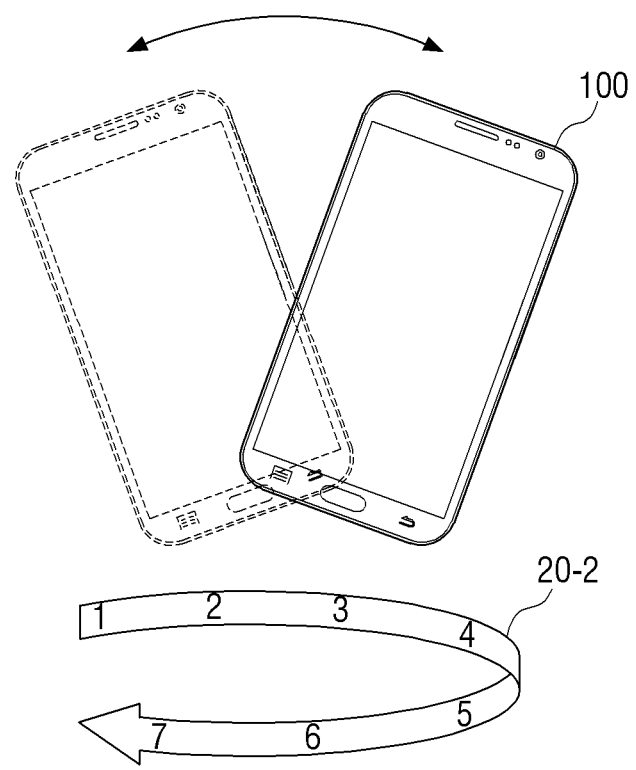

FIG. 7 is a diagram for illustrating information on a view direction of a camera according to an embodiment of the disclosure.

In the video 10, the moving direction of the camera 120 may not be constant, such as from the left to the right (or, from the right to the left) or from up to down (or, from down to up). Also, during capturing, shaking of the video 10 may occur due to shaking of the camera 120. The video 10 captured freely by a user may not have specific directivity.

Referring to FIG. 7, there may be a video captured as the camera 120 moves from the first direction to the second direction, and then to the first direction again.

The processor 140 according to an embodiment of the disclosure may obtain a video wherein the order of the plurality of image sections was rearranged based on information on a view direction 20-2 of the camera 120. As an example, a case wherein the video 10 includes first to seventh image sections may be assumed. The processor 140 may identify that the first to fourth image sections have directivity of moving from the first direction to the second direction, and the fifth to seventh image sections have directivity of moving from the second direction to the first direction based on the information on the view direction 20-2. A detailed embodiment wherein the processor 140 obtains a video wherein the order of the plurality of image sections was rearranged will be described with reference to FIG. 8.

Figure 8:
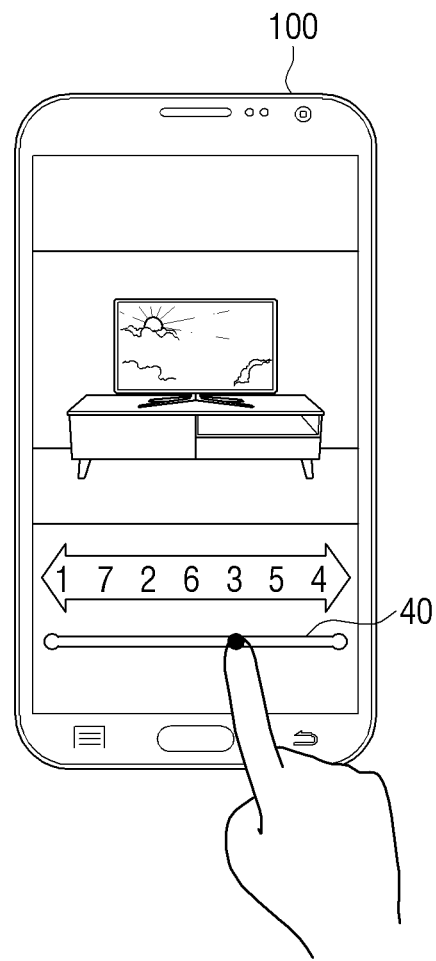
FIG. 8 is a diagram for illustrating a navigation bar according to an embodiment of the disclosure.

FIG. 8 is a diagram for illustrating a navigation bar according to an embodiment of the disclosure.

The processor 140 according to an embodiment of the disclosure may rearrange the plurality of image sections such that a moving direction of the view of the camera 120 has specific directivity based on the information on the view direction 20-2.

For example, if still images (or, images having frames in a predetermined number) captured at each of the first to seventh time points are arranged in the order of the capture time as illustrated in FIG. 7, the view direction of the camera 120 moves from the left to the right, and then to the left again. However, as illustrated in FIG. 8, the processor 140 may obtain a video wherein still images captured in each of the first to seventh time points are rearranged to have specific directivity based on the information on the view direction 20-2. For example, the processor 140 may obtain a video wherein images are rearranged in the order of the first, the seventh, the second, the sixth, the third, the fifth, and the fourth image sections. However, this is merely an example, and the processor 140 according to the various embodiments of the disclosure can obviously obtain a video wherein a plurality of image sections are rearranged according to various standards. For example, the processor 140 may rearrange a plurality of image sections such that they have directivity of moving from up to down based on the floor plane, or rearrange a plurality of image sections such that they have directivity of moving from down to up.

The processor 140 according to an embodiment of the disclosure may display a navigation bar 40 for adjusting a time point of reproducing the rearranged video together with the video. Here, the processor 140 may generate and display the navigation bar 40 based on the specific directivity that the plurality of rearranged image sections have. For example, if the directivity is from the left to the right, the processor 140 may generate a navigation bar in a horizontal form, and if the directivity is from up to down, the processor 140 may generate a navigation bar in a vertical form. However, this is merely an example, and the disclosure is not limited thereto. For example, if the plurality of image sections of which order was rearranged have directivity of 360 degrees in all directions, the processor 140 can obviously generate and display a navigation bar in a circular form.

The processor 140 according to an embodiment of the disclosure can obviously display a guide UI guiding a moving direction during capturing of a video through the camera 120. Here, the guide UI is a guide UI guiding such that the camera 120 moves from the first direction to the second direction, and for a video captured according to the guide UI, the moving direction of the view of the camera 120 may have specific directivity.

Returning to FIG. 1, the processor 140 according to an embodiment of the disclosure may obtain information on an object included in each of the plurality of image sections and store the information as spatial information 20. Then, the processor 140 may obtain location information for adding the virtual object image 30 to one area of the object based on the information on the object in each of the plurality of image sections. A method for the processor 140 to identify an object, and add the virtual object image 30 to the object will be described with reference to FIG. 9A and FIG. 9B.

Figure 9A:
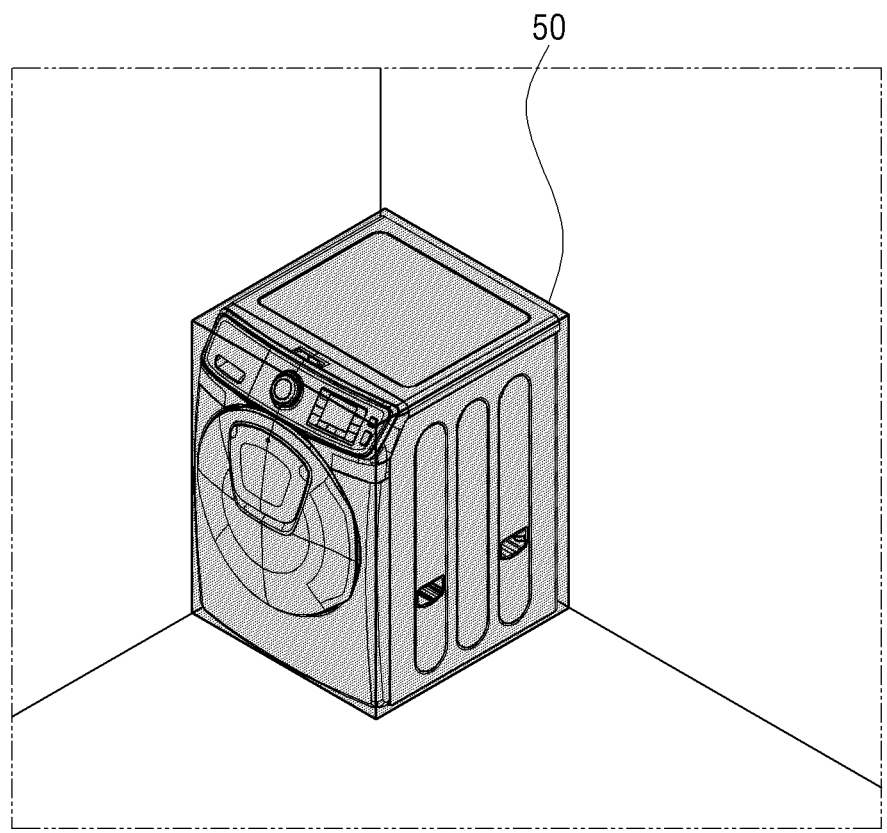
FIG. 9A is a diagram for illustrating a method of identifying an object according to an embodiment of the disclosure.

FIG. 9A is a diagram for illustrating a method of identifying an object according to an embodiment of the disclosure.

Referring to FIG. 9A, the processor 140 according to an embodiment of the disclosure may identify an object 50 included in each of the plurality of image sections, and obtain information on the object 50. As an example, the processor 140 may apply a video to a learning network model, and obtain information on the object 50 included in each of the plurality of image sections. For example, the learning network model 50 may identify the type of the object 50 included in each of the plurality of image sections. Then, the learning network model 50 may identify at least one of the form or the size of the object 50 based on the identified type of the object 50. As an example, the learning network model 50 may include information on the object 50 including at least one of the form or the size information for each of the plurality of objects 50. The learning network model may identify at least one of the form or the size of the object 50 based on the information on the object 50 corresponding to the identified object 50. Here, the form of the object 50 is the schematic shape, the form, etc. of the object 50 defined according to the boundary surface between the object 50 and the outside, and it may mean a cuboid, a cube, a circular shape, an oval shape, etc. The size of the object 50 may include W*H*D (mm) information based on the lengths of the width (or, the horizontal length), the height, and the depth of the object. Here, the length unit is obviously not limited to mm, and the size of the object 50 can obviously be expressed based on various units such as inches (in), feet (ft), etc.

Referring to FIG. 9A, the learning network model may identify that the type of the object 50 included in each of the plurality of image sections is a washing machine, and obtain information on the washing machine including at least one of the form or the size of the washing machine. For example, the learning network model may identify a cuboid as the form of the washing machine, and obtain information on the lengths of the width, the height, and the depth defining the size of the cuboid as the size information of the object 50.

Here, the learning network model may be a model that is convolution neural network (CNN)-trained based on a plurality of sample images. Here, the CNN is a multilayer neural network having a special connecting structure designed for image processing, voice processing, object identification, etc. In particular, the CNN may filter a video in various ways through preprocessing of pixels included in an input video, and recognize the features of the video. As an example, the CNN may recognize at least one of the type, the form, or the size of an object included in a video. Meanwhile, the learning network model is obviously not limited to the CNN. For example, it is obvious that an image processing device 100 can use a learning network model based on various neural networks such as a recurrent neural network (RNN), a deep neural network (DNN), a generative adversarial network (GAN), etc.

As another example, the processor 140 according to an embodiment of the disclosure may analyze each of the plurality of image sections, and obtain exterior information of the object 50. For example, the processor 140 may identify a 2D shape of the object 50 based on the outer rim line of the object 50. Then, the processor 140 may identify a 2D image of which similarity to the identified 2D shape is greater than or equal to a threshold value among the plurality of 2D images that captured the object 50 in different view directions or different distances. Then, the processor 140 may identify at least one of the type, the form, or the size of the object 50 included in the video based on the identified 2D image.

As an example, referring to FIG. 9A, if a 2D shape is identified as a lozenge based on the outer rim line of the object 50 included in the video, the processor 140 may identify the object 50 having similarity greater than or equal to a threshold value to the lozenge identified in the view direction, the angle, or the pose of the camera 120. If the identified object 50 is a washing machine, the processor 140 may obtain information including the form and the size of the washing machine.

Also, the processor 140 according to an embodiment of the disclosure may identify the location of the object 50. As an example, the processor 140 may apply a video to a learning network model and identify the form of the space, and identify the location of the object 50. For example, the learning network model may identify the area, the size, the shape, etc. of the space based on wall surfaces surrounding the space or furniture, steps, home appliances, a threshold, etc. located in the space, and identify the location of the object 50.

Then, the processor 140 according to an embodiment of the disclosure may obtain location information for adding the virtual object image 30 to one area of the object 50 based on the location information for the object 50 in each of the plurality of image sections. Then, the processor 140 may obtain the virtual object image 30 in a shape corresponding to the information on the view direction of the camera 120, and add the obtained virtual object image 30 to a corresponding image section based on the location information and provide the image.

Figure 9B:
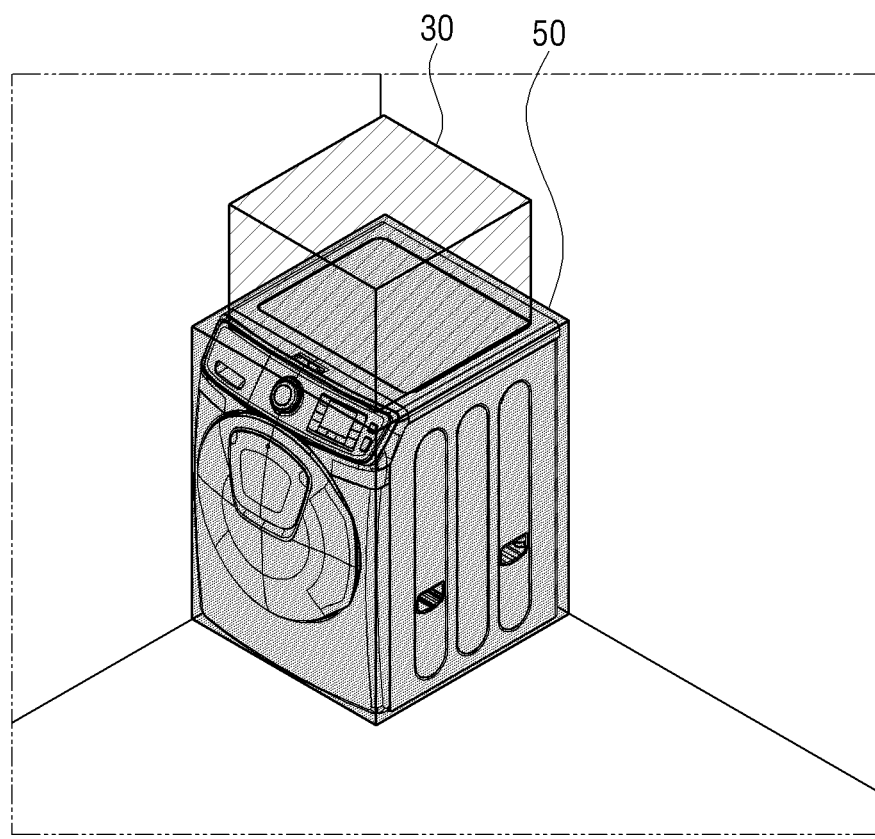
FIG. 9B is a diagram for illustrating a method of adding a virtual object image according to an embodiment of the disclosure.

FIG. 9B is a diagram for illustrating a method of adding a virtual object image according to an embodiment of the disclosure.

Referring to FIG. 9B, the processor 140 may identify an area to which the virtual object image 30 can be added based on the information on the object 50. For example, the processor 140 may obtain location information for adding the virtual object image 30 based on the form of the object 50 included in the information on the object 50. As illustrated in FIG. 9B, the processor 140 may identify that addition of the virtual object image 30 to the upper end is possible based on the cuboid form of the washing machine. Then, the processor 140 may obtain the virtual object image 30 in a shape corresponding to the information on the view direction of the camera 120, and add the obtained virtual object image to a corresponding image section based on the location information. The electronic device 100 may provide the object 50 that exists in the space and the virtual object image 30 through one video. Meanwhile, the location, the size, etc. of the added virtual object image 30 can obviously be changed according to a user command. For example, as illustrated in FIG. 9B, the location of the virtual object image 30 is not fixed to the upper side of the object 50, and it can obviously be located in a plane space on the bottom of the space according to a user manipulation.

Meanwhile, the processor 140 may adjust the size of the virtual object image 30 based on the size of the object 50 included in the information on the object 50 and add the image to an image section. The processor 140 according to an embodiment of the disclosure may resize the size of the virtual object image 30 based on the location information and 3D mesh data and add the image. As an example, if it is determined that the area of the identified object 50 is smaller than the size of the virtual object image 30 according to the location information for adding the virtual object image 30, the processor 140 may adjust the size of the virtual object image 30 based on the location information and add the image to an image section. Meanwhile, this is merely an example, and the size of the virtual object image 30 does not necessarily have to be resized such that the size becomes smaller. For example, the processor 140 may adjust the size of the virtual object image 30 to be in proportion to the actual size of the object 50 based on the size of the object 50 and the size of the 3D virtual object based on mesh data, and add the image to an image section.

Returning to FIG. 1, if a user command for adding another virtual object image to one area of the virtual object image 30 is input, the processor 140 according to an embodiment of the disclosure may control the display 110 to display the another virtual object image in a form of being laminated on the virtual object image based on information on the virtual object image 30. Detailed explanation in this regard will be made with reference to FIG. 10.

Figure 10:
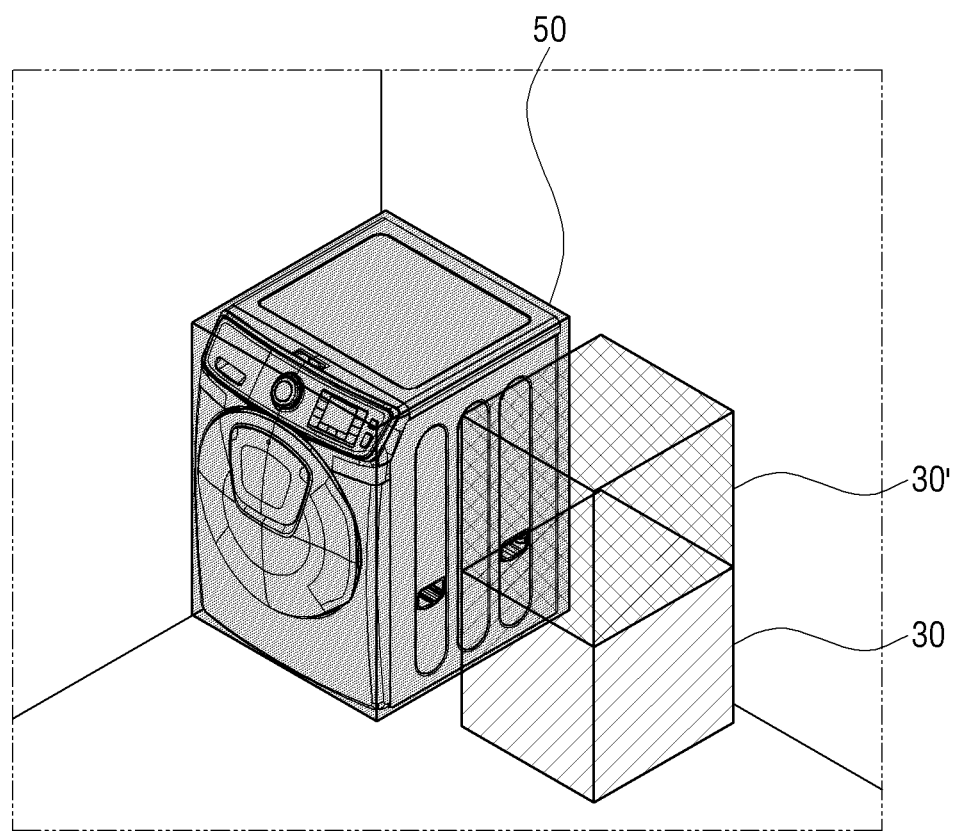
FIG. 10 is a diagram for illustrating a plurality of virtual object images according to an embodiment of the disclosure.

FIG. 10 is a diagram for illustrating a plurality of virtual object images according to an embodiment of the disclosure.

Referring to FIG. 10, the processor 140 may add a plurality of virtual object images to a video. For example, after the virtual object image 30 is added to an image section, the processor 140 may add another virtual object image 30' to the image section according to a user command. In this case, the processor 140 may add the another virtual object image 30' to the image section based on information on the virtual object image 30. Here, the information on the virtual object image 30 may mean mesh data of a 3D virtual object corresponding to the virtual object image 30. The processor 140 may identify the form, the size, etc. of the virtual object image 30 based on the mesh data of the 3D virtual object, and in adding the another virtual object image 30' to an image section, the processor 140 may consider the form and the size of the virtual object image 30. Here, the size of the virtual object image 30 may mean the height, the width, and the depth of the virtual object image 30.

As illustrated in FIG. 10, the processor 140 may add the another virtual object image 30' in a location that is distanced from the bottom as much as the height of the virtual object image 30 based on the size of the virtual object image 30. By providing a video wherein the virtual object image 30 and the another virtual object image 30' interact, the processor 140 may provide a video as if the virtual object image 30 and the another virtual object image 30' actually exist to a user.

Returning to FIG. 1, if a command for removing the virtual object image 30 is input, the processor 140 according to an embodiment of the disclosure may remove the virtual object image 30. Then, the processor 140 may adjust the location of the another virtual object image 30' added in a form of being laminated on the virtual object image 30. Detailed explanation in this regard will be made with reference to FIG. 11.

Figure 11:
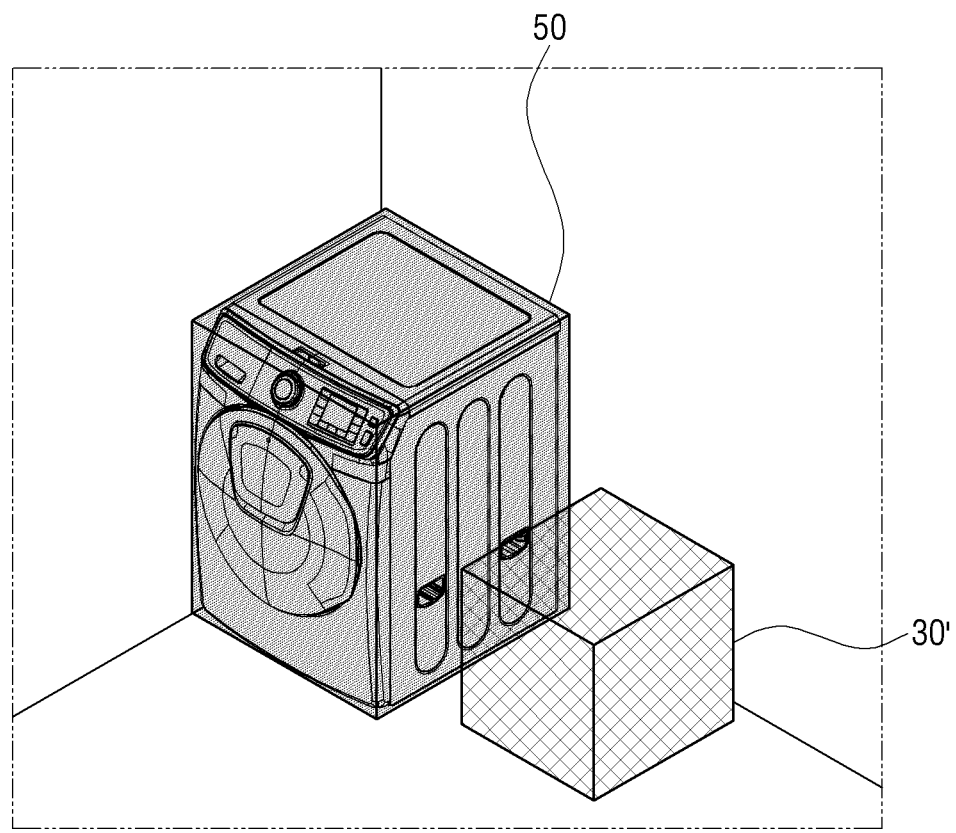
FIG. 11 is a diagram for illustrating a case of removing a virtual object image according to an embodiment of the disclosure.

FIG. 11 is a diagram for illustrating a case of removing a virtual object image according to an embodiment of the disclosure.

Referring to FIG. 11, the processor 140 may remove the virtual object image 30 added to an image section according to a user command. As illustrated in FIG. 10, if a command for removing the another virtual object image 30' added in a form of being laminated on the virtual object image 30 is received, the processor 140 may remove the another virtual object image 30' and maintain the virtual object image 30.

As another example, if a command for removing the virtual object image 30 located in the lower part of the another virtual object image 30' is received, the processor 140 may remove the virtual object image 30, and then adjust the location of the another virtual object image 30'. As the processor 140 added the another virtual object image 30' based on the information on the virtual object image 30, and added the another virtual object image 30' in a location that is distanced from the bottom as much as the height of the virtual object image 30, the processor 140 may identify new location information for adding the another virtual object image 30' according to the command for removing the virtual object image 30.

As an example, the processor 140 may reobtain location information for adjusting the location of the another virtual object image 30' based on the information on the object 50 and the information on a plane space 20-1. Then, the processor 140 may adjust the location of the another virtual object image 30' based on the reobtained location information. Meanwhile, if a plurality of location information are reobtained, the processor 140 may identify one location information that minimizes the difference from the previous location information that the another virtual object image 30' is located among the plurality of location information. As an example, referring to FIG. 11, the processor 140 may obtain one area of the object 50 and one area of a plane space on the bottom as location information. Then, as movement of the location from the location coordinate value of the another virtual object image 30' defined with x, y, and z axes to one area of a plane space on the bottom requires only the change of the location coordinate value of one axis (e.g., they axis) unlike movement of the location to one area of the object 50, the processor 140 may move the another virtual object image 30' to one area of a plane space on the bottom. The processor 140 may control the display 110 to display the another object image 30' in the location wherein the object image 30 was removed.

As another example, if a command for removing the virtual object image 30 is input while the virtual object image 30 and the another virtual object image 30' are laminated, the processor 140 may provide a visual feedback as if the virtual object image 30' falls to a plane space on the bottom according to gravity based on a physic engine.

Returning to FIG. 1, the processor 140 according to an embodiment of the disclosure may obtain information on the object 50 included in each of the plurality of image sections and information on the form of the space wherein the object 50 is located and store the same as spatial information 20, and if a user command for replacing the object 50 with a virtual object is input, the processor 140 may overlap the virtual object image 30 with the object 50 based on the information on the object 50 and the information on the form of the space, and display the image. Detailed explanation in this regard will be made with reference to FIG. 12.

Figure 12:
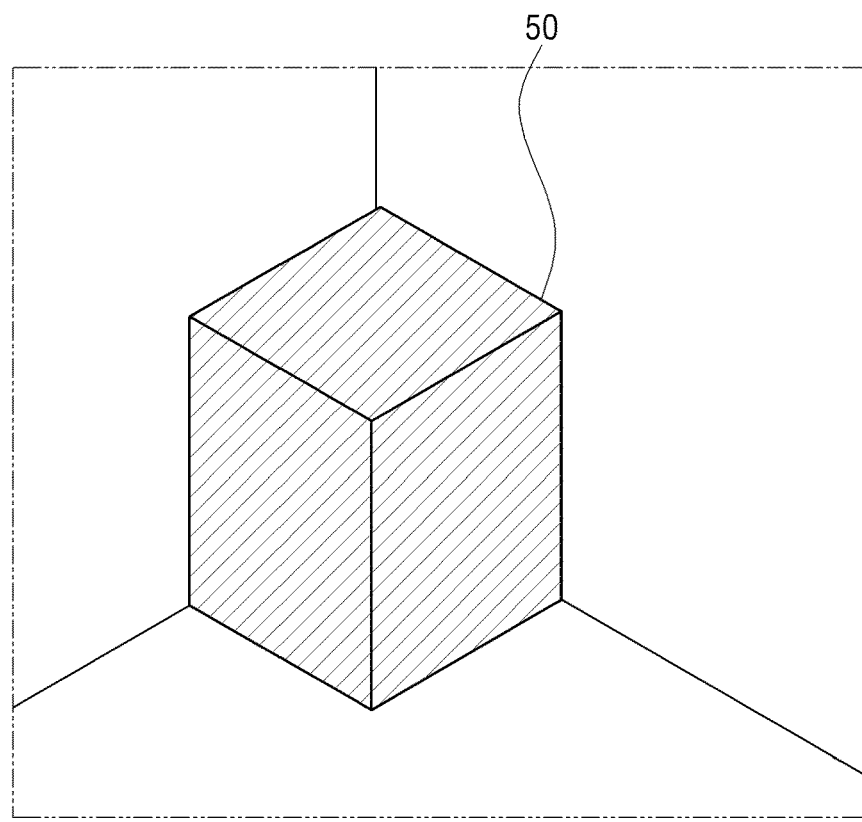
FIG. 12 is a diagram for illustrating a method of replacing an object according to an embodiment of the disclosure.
Figure 12:
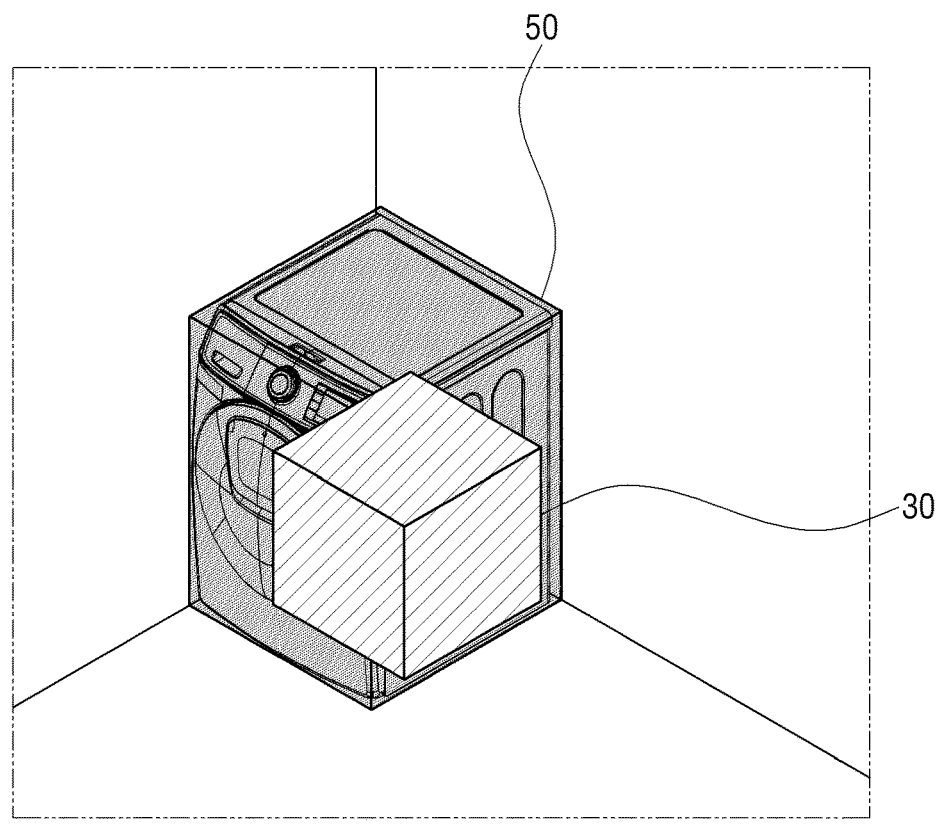

FIG. 12 is a diagram for illustrating a method of replacing an object according to an embodiment of the disclosure.

Referring to FIG. 12, the processor 140 according to an embodiment of the disclosure may analyze the plurality of image sections and obtain information on the form of the space wherein the object 50 is located. As an example, the processor 140 may apply the plurality of image sections to a learning network model and identify the form of the space. Here, the information on the form of the space may include the area, size, and shape information of the space based on wall surfaces surrounding the space or furniture, steps, home appliances, a threshold, etc. located in the space.

Then, if a user command for replacing the object 50 included in an image section with a 3D virtual object is input, the processor 140 according to an embodiment of the disclosure may overlap the virtual object image 30 with the object 50 based on the information on the object 50 and display the image.

Here, the processor 140 may prevent the virtual object image 30 from being added while going through a wall surface and a threshold other than the object 50 based on the information on the form of the space. Meanwhile, the processor 140 according to an embodiment of the disclosure may obtain information on the form and the size of a 3D virtual object based on information on the 3D virtual object, i.e., mesh data. Then, if the size of the 3D virtual object is bigger than the size of the object 50, the processor 140 may overlap the virtual object image 30 corresponding to the 3D virtual object with the object 50 and display the image, as illustrated in the upper part of FIG. 12. Meanwhile, the location and the size of the virtual object image 30 can obviously be changed according to a user input.

As another example, if the size of the object 50 is bigger than the size of the 3D virtual object, the processor 140 may overlap the virtual object image 30 corresponding to the 3D virtual object with one area of the object 50 and display the image, as illustrated in the lower part of FIG. 12.

Figure 13:
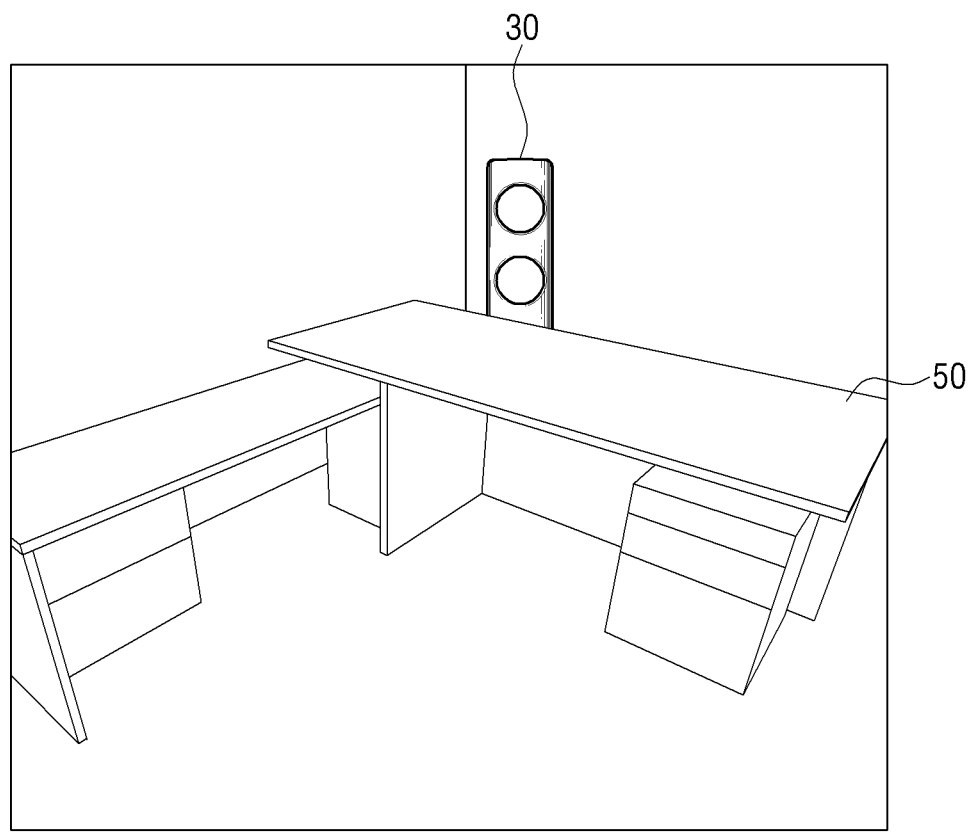
FIG. 13 is a diagram for illustrating an interaction of an object and a virtual object image according to an embodiment of the disclosure.

FIG. 13 is a diagram for illustrating an interaction of an object and a virtual object image according to an embodiment of the disclosure.

Referring to FIG. 13, the processor 140 according to an embodiment of the disclosure may use depth data for adding the virtual object image 30. Here, the depth data may mean distance data between the camera 120 and the object 50. The camera 120 provided in the electronic device 100 according to an embodiment of the disclosure may include a depth camera. The depth camera according to an embodiment may measure the time that a light is reflected back after being emitted by using a time of flight (TOF) method. Then, the processor 140 may calculate the distance between the camera 120 and the object 50 based on the measured TOF. Then, the processor 140 may obtain depth data for each object 50.

As another example, the processor 140 may obtain a plurality of images through the camera 120, analyze the plurality of images, and identify objects located in a near distance from the camera 120 or objects located in a far distance. As still another example, the processor 140 can obviously apply a learning network model to a video and identify the distance between objects included in the video and the camera 120, and obtain depth data.

The processor 140 according to an embodiment of the disclosure may perform control such that a part of the virtual object image 30 is not provided through the display 110 based on depth data. As an example, if it is identified that the location wherein the virtual object image 30 is added is a farther distance than the object 50 based on depth data, the processor 140 may provide an effect that one area of the virtual object image 30 is covered by the object 50. For example, the processor 140 may provide a video by rendering the virtual object image 30 located in a far distance first, and then rendering the object 50 located in a near distance to be overlapped with the virtual object image 30. The processor 140 according to an embodiment of the disclosure may identify distance information among objects and distance information between the camera 120 and objects based on depth data, and according to an occlusion mask based on this, objects located in a far distance from the camera 120 are drawn first, and then objects located in a near distance are covered one by one, and the virtual object image 30 may be added such that a part of the virtual object image 30 is covered by an object.

Returning to FIG. 1, the electronic device 100 according to an embodiment of the disclosure may include a communicator (not shown). Detailed explanation regarding the communicator will be made with reference to FIG. 2.

The processor 140 according to an embodiment of the disclosure may control the communicator to transmit the plurality of image sections and spatial information mapped to each of the plurality of image sections stored in the memory 130 to an external device.

If a video to which another virtual object image was added based on the plurality of image sections and spatial information mapped to each of the plurality of image sections is received from an external device, the processor 140 according to an embodiment of the disclosure may control the display to replace the virtual object image with the another virtual object image included in the received video and display same. Detailed explanation in this regard will be made with reference to FIG. 14.

Figure 14:
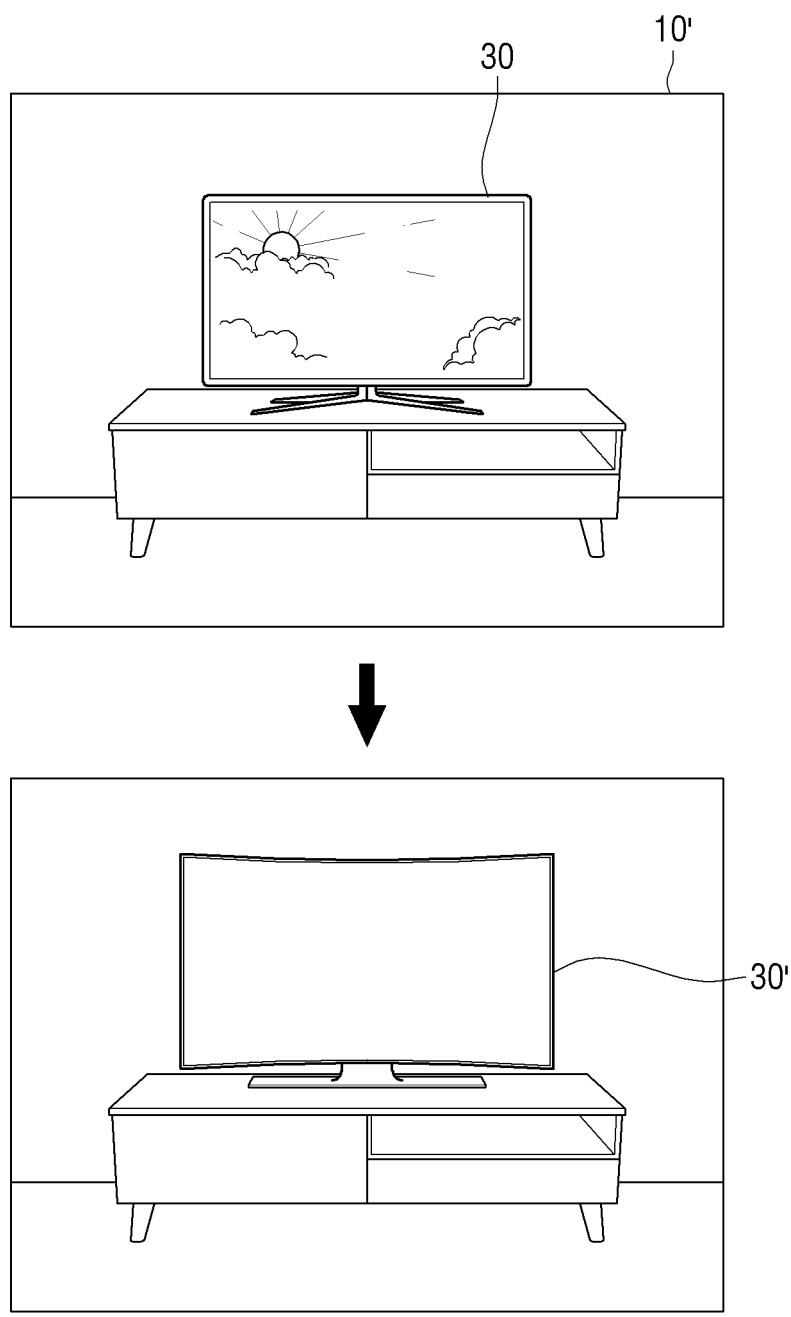
FIG. 14 is a diagram for illustrating an object image according to another embodiment of the disclosure.

FIG. 14 is a diagram for illustrating a virtual object image according to another embodiment of the disclosure.

The processor 140 according to the various embodiments of the disclosure may store the spatial information 20 obtained in an image section in the memory 130, or transmit the spatial information 20 to an external device. The processor 140 may add a virtual object image 30 to a video 10 stored in the memory 130 but not a video 10 captured in real time through the camera 120 based on the spatial information 20, and provide an effect like augmented reality to a user.

According to an embodiment of the disclosure, if an external device adds another virtual object image 30' to a video 10 based on the video 10 and the spatial information 20 received from the electronic device 100, the processor 140 may receive information on the another virtual object image 30' from the external device and add the another virtual object image 30' to the video 10 based on the information on the another virtual object image 30'.

Referring to FIG. 14, if a video to which another virtual object image 30' was added is received from an external device, the processor 140 may replace the virtual object image 30 with the another virtual object image 30' and display same.

The processor 140 according to an embodiment of the disclosure may perform communication with an external device through the communicator and share a video 10' to which the virtual object image 30 was added. If the virtual object image 30 is changed to the another virtual object image 30' in the external device, the processor 140 may replace the virtual object image 30 with the another virtual object image 30' and display the video 10'. As another example, the processor 140 may display a notification UI notifying that the another virtual object image 30' was selected in the external device. As still another example, the processor 140 may display the video 10 and the another virtual object image 30' that are being displayed on the external device on the display 110 in a PIP mode.

Returning to FIG. 1, if a user command for at least one of change of the location or rotation of the virtual object image 30 included in the displayed video 10' is input, the processor 140 according to an embodiment of the disclosure may obtain at least one of direction information or distance information corresponding to the user command, obtain a virtual object image 30 corresponding to the user command among the plurality of virtual object images based on the obtained information and control the display 110 to display same. Detailed explanation in this regard will be made with reference to FIG. 15.

Figure 15:
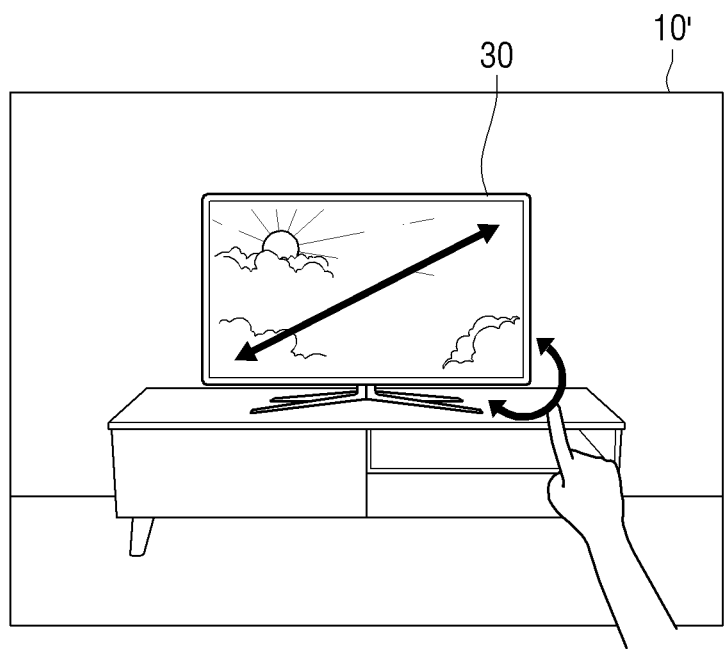
FIG. 15 is a diagram for illustrating change of the location or rotation of an object image according to an embodiment of the disclosure.

FIG. 15 is a diagram for illustrating change of the location or rotation of a virtual object image according to an embodiment of the disclosure.

Referring to FIG. 15, the processor 140 according to an embodiment of the disclosure may obtain location information for adding a virtual object image 30 based on information on a plane space 20-1, and obtain the virtual object image 30 in a shape corresponding to information on a view direction 20-2. Meanwhile, a case wherein detailed adjustment for the location, the direction, etc. of the obtained virtual object image 30 is required may be assumed.

If a user command for at least one of change of the location or rotation of the virtual object image 30 is input, the processor 140 according to an embodiment of the disclosure may obtain the virtual object image 30 corresponding to the user command among a plurality of virtual object images that captured a 3D virtual object image in different directions or different distances, and add the image to the video 10.

Figure 16:
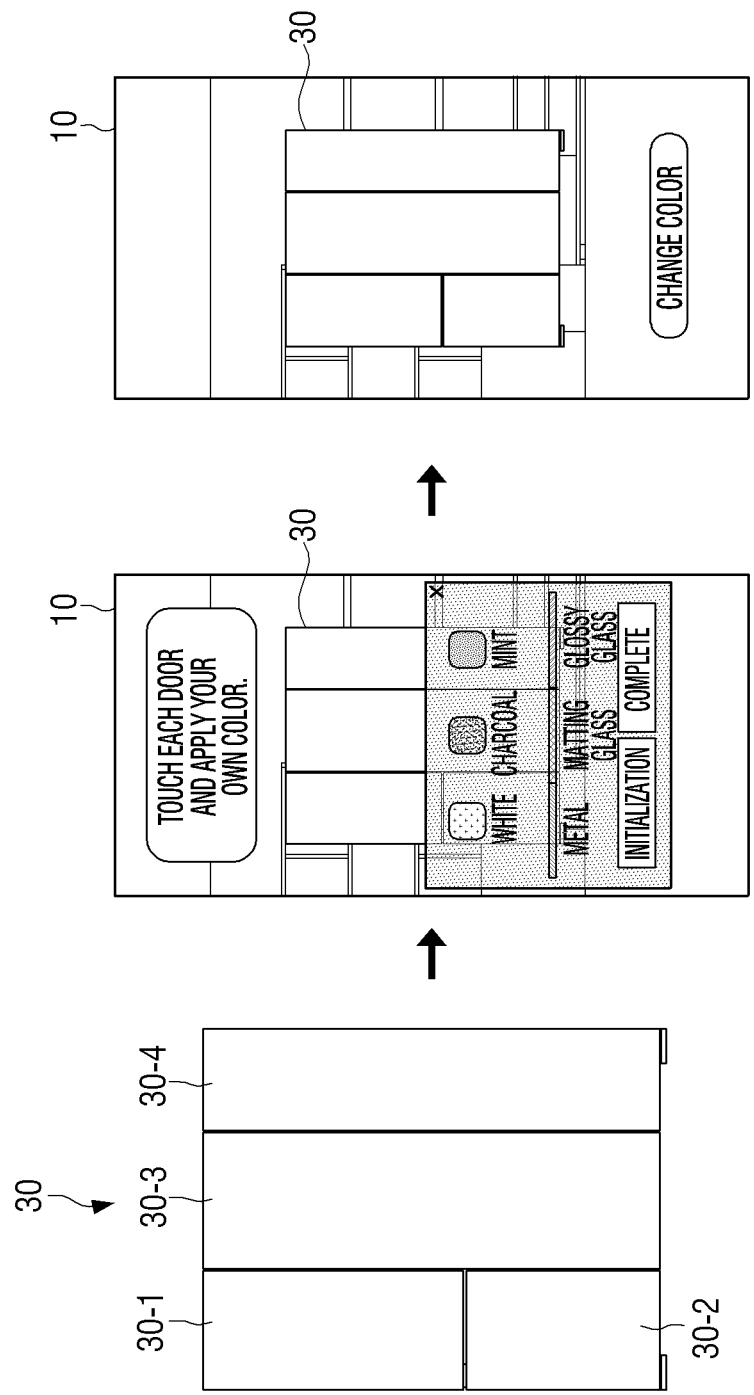
FIG. 16 is a diagram for illustrating a method of obtaining a virtual object image according to an embodiment of the disclosure.

FIG. 16 is a diagram for illustrating a method of obtaining a virtual object image according to an embodiment of the disclosure.

The processor 140 according to an embodiment of the disclosure may control the display 110 to display a UI including at least one module image based on information on a subject electronic device.

Then, the processor 140 may obtain a module-type electronic device based on a module image selected by a user input among at least one module, and obtain a virtual object image 30 corresponding to the obtained module-type electronic device. Here, the virtual object image 30 may be an AR object corresponding to the module-type electronic device. A module may mean an independent component for providing a function among various functions of an electronic device, and a module-type electronic device may mean an electronic device including a single module or at least two modules.

As an example, the processor 140 may identify a plurality of modules that can be selected based on information on a subject electronic device. Here, information on a subject electronic device may include information on the type of the electronic device, a plurality of module images that can be selected according to the model name, a plurality of functions that can be added, and a plurality of functions that can be removed.

Then, the processor 140 may obtain the virtual object image 30 corresponding to the module-type electronic device based on at least one module image selected according to a user input among the at least one module image. Here, each of the modules may have different sizes, functions, and forms. Meanwhile, it is obvious that the information on the subject electronic device can be stored in the electronic device 100 in advance, or can be received from an external server.

For example, if the subject electronic device is assumed as a refrigerator, the processor 140 may identify a plurality of modules that can be selected in the refrigerator. Here, each of the plurality of modules may be divided into modules corresponding to a refrigerating chamber, a freezing chamber, and a temperature conversion chamber. Also, modules corresponding to the refrigerating chamber may be divided into first to nth refrigerating chambers according to at least one of the size or the form.

As another example, modules corresponding to the freezing chamber may be divided into first to nth freezing chambers according to at least one of the size or the form.

Referring to FIG. 16, the processor 140 may obtain the virtual object image 30 corresponding to a module-type electronic device including a first refrigerating chamber 30-1, a second refrigerating chamber 30-2, a first freezing chamber 30-3, and a first temperature conversion chamber 30-4 selected according to a user input among module images corresponding to each of the plurality of modules.

Meanwhile, explanation was made based on the assumption of a case wherein the processor 140 provides modules that can be selected based on information on a subject electronic device, and obtains the virtual object image 30 corresponding to a module-type electronic device including at least one module selected according to a user input according to an embodiment of the disclosure, but the disclosure is obviously not limited thereto. For example, it is obvious that the processor 140 can obtain the virtual object image 30 corresponding to a module-type electronic device including at least one module of which sizes and forms are defined in various ways according to a user input.

As another example, the processor 140 can obviously obtain the virtual object image 30 by providing a basic image corresponding to a subject electronic device, and changing at least one of the size or the form according to a user input, or adding modules. For example, if a module-type electronic device is a refrigerator, the processor 140 can obviously obtain the virtual object image 30 by providing a basic image including the first refrigerating chamber 30-1 and the second refrigerating chamber 30-2, and changing the size or the form of at least one of the first refrigerating chamber 30-1 and the second refrigerating chamber 30-2 according to a user input, or adding the first freezing chamber 30-3.

Meanwhile, a subject electronic device is not limited to a refrigerator, and it can obviously include a display device, an air-conditioning device such as an air conditioner, various types of home appliances such as a washing machine, a smart machine such as an industrial robot used in a manufacturing process of a product, etc. For example, the processor 140 may obtain the virtual object image 30 corresponding to a display device including a first display module and a second display module. Here, at least one of the size or the form of each of the first display and the second display can obviously be changed according to a user input.

Referring to FIG. 16, the processor 140 may obtain the virtual object image 30 corresponding to a module-type electronic device including modules desired by a user or a customized module-type electronic device.

Then, the processor 140 according to an embodiment of the disclosure may provide a UI for changing the color, the material, etc. of the module-type electronic device. Referring to FIG. 16, if a user command for changing at least one of the color or the material of at least one module image included in the virtual object image is received, the processor 140 may change the virtual object image 30 based on the user command. As the virtual object image 30 wherein at least one of the color or the material was changed according to the user command is displayed, the user may check the module-type electronic device of which color, material, etc. are customized. Here, the color and the material may mean the color and the material applied to the main body of the module-type electronic device. For example, if the module-type electronic device is a refrigerator, the refrigerator may include a main body of which front surface is opened, a storage which is formed inside the main body and wherein food is refrigerated and/or kept, and a door opening or closing the opened front surface of the main body. The processor 140 may change the color and the material of the door according to a user input. However, this is merely an example, and the processor 140 can obviously change the color and the material of the storage according to a user input.

Referring to FIG. 16, the processor 140 according to an embodiment of the disclosure may restrictively provide colors and materials that a user can select based on information on a subject electronic device. As an example, if a module-type electronic device is a refrigerator, the processor 140 may provide white, charcoal and mint colors as colors that can be selected, and provide metal, matting glass, and glossy glass as materials that can be selected. However, the detailed colors and materials mentioned according to an embodiment of the disclosure are merely examples, and various colors and materials can obviously be provided.

As another example, it is obvious that the processor 140 can provide a UI through which a user can select various colors and materials that the user wants without limitations, and obtain the virtual object image 30 to which the color and the material selected according to a user input was applied.

Referring to FIG. 16, in a module-type electronic device consisting of a plurality of modules, the processor 140 may obtain the virtual object image 30 wherein colors corresponding to a user input were applied to each of the plurality of modules. For example, the processor 140 may obtain the virtual object image 30 wherein a white color was applied to the first and second refrigerating chambers 30-1, 30-2, a charcoal color was applied to the first freezing chamber 30-3, and a mint color was applied to the first temperature conversion chamber 30-4. As another example, the processor 140 can obviously obtain the virtual object image 30 wherein the same color was applied to the first and second refrigerating chambers 30-1, 30-2, the first freezing chamber 30-3, and the first temperature conversion chamber 30-4.

Then, the processor 140 according to an embodiment of the disclosure may add the virtual object image 30 to the video 10. The processor 140 according to an embodiment of the disclosure may locate the virtual object image 30 in one area of the video 10 according to a user input for the virtual object image 30.

As another example, the processor 140 can obviously apply the virtual object image 30 and the video 10 to a learning network model and identify an area wherein the virtual object image 30 can be located within the video 10, and locate the virtual object image 30 in the area.

The processor 140 according to an embodiment of the disclosure may provide a function of requesting an order for a module-type electronic device. As an example, the processor 140 may add the virtual object image 30 to the video 10, and include an 'order' button within the video 10. If a user input for the button is received, the processor 140 may transmit information on the virtual object image 30 to an external server. Here, the external server may mean the manufacturer of the module-type electronic device. It is obvious that the information on the virtual object image 30 can include the modules, the color, and the material selected according to a user input or the size, the form, etc. changed according to a user input.

The processor 140 according to another embodiment of the disclosure may identify whether a module-type electronic device obtained according to a user input can be produced based on the type or the model name for the module-type electronic device. As an example, according to the model name for a module-type electronic device, there may be limitations on functions that can be added, the number of modules that can be selected, etc. The processor 140 may transmit information on the virtual object image 30 to an external server, and receive information on whether a module-type electronic device corresponding to the virtual object image 30 can be produced by the manufacturer from the external server. As another example, the processor 140 can obviously identify by itself whether a module-type electronic device corresponding to the virtual object image 30 can be produced.

According to an embodiment of the disclosure, if it is identified that a module-type electronic device according to the virtual object image 30 cannot be produced, the processor 140 may apply and provide a visual feedback to the virtual object image 30. For example, the processor 140 may blur the virtual object image 30, or apply a red background color to the virtual object image 30. However, this is merely an example, and various visual feedbacks such as a warning pop-up window or auditory feedbacks can obviously be provided.

Figure 17:
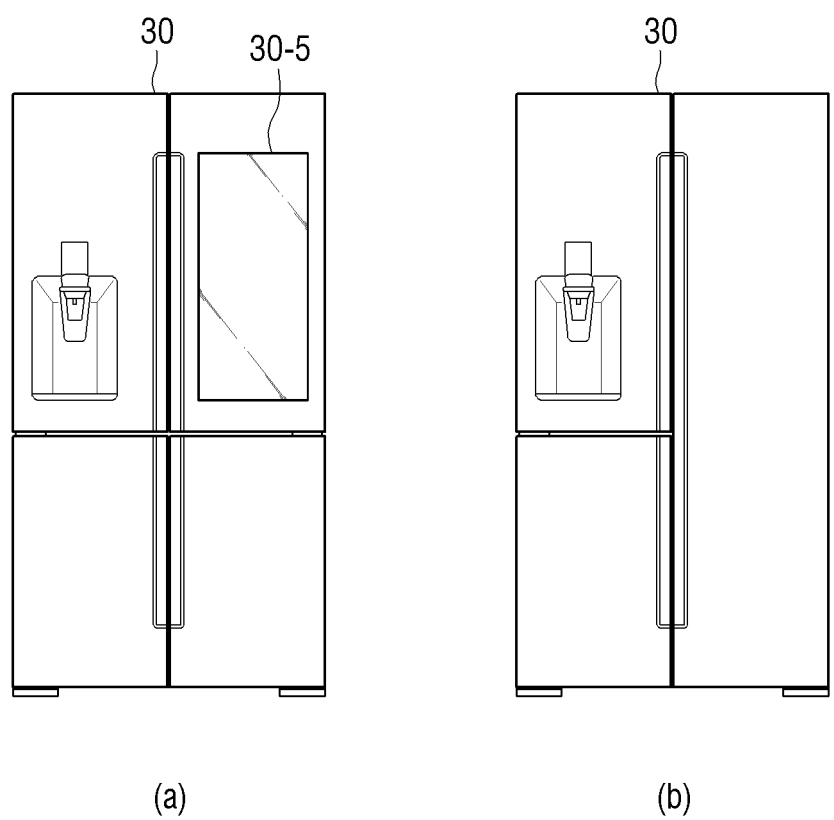
FIG. 17 is a diagram for illustrating a virtual object image according to an embodiment of the disclosure.

FIG. 17 is a diagram for illustrating a virtual object image according to an embodiment of the disclosure.

Referring to (a) in FIG. 17, the processor 140 may identify a plurality of functions that can be added or removed based on information on a subject electronic device, and obtain the virtual object image 30 corresponding to the module-type electronic device wherein some functions were added or removed according to a user input.

As an example, if a subject electronic device is assumed as a refrigerator, the refrigerator may include a door opening or closing the front surface of the storage wherein food is refrigerated and/or kept. If a display 30-5 is selected among a plurality of functions that can be added, the processor 140 according to an embodiment of the disclosure may obtain the virtual object image 30 while arranging the display 30-5 in a location on the door corresponding to a user input. As another example, the processor 140 may obtain the virtual object image 30 while arranging the display 30-5 in a size corresponding to a user input. As still another example, referring to FIG. 17, the processor 140 can obviously obtain the virtual object image 30 corresponding to a refrigerator wherein a water purifying function was added or removed according to a user input.

Referring to (b) in FIG. 17, if a refrigerating chamber module in the upper left part, a refrigerating chamber module in the lower left part, and a freezing chamber module in the right part are selected according to a user input among a plurality of modules, the processor 140 may obtain the virtual object image 30 corresponding to the refrigerator including the selected modules. Then, the processor 140 can obviously change the arrangement forms, the sizes, the colors, the materials, etc. of each of the modules according to a user input.

Figure 18:
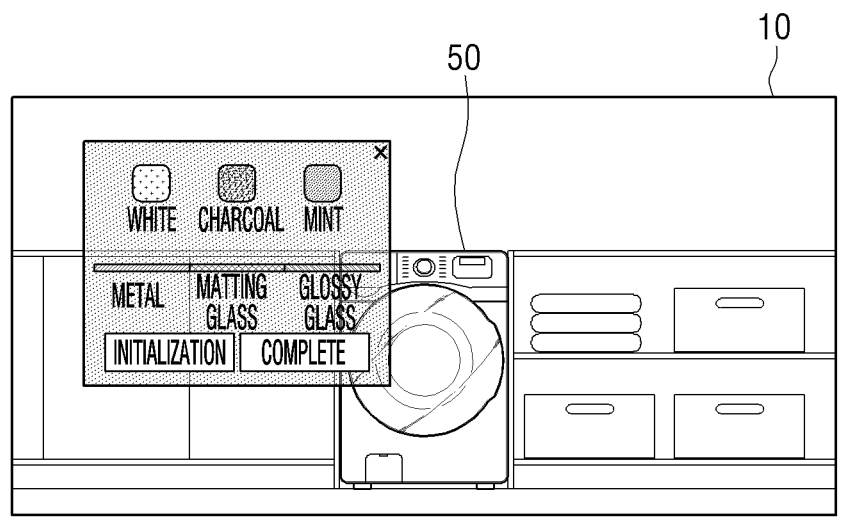
FIG. 18 is a diagram for illustrating an object according to another embodiment of the disclosure.

FIG. 18 is a diagram for illustrating an object according to an embodiment of the disclosure.

Referring to FIG. 18, the processor 140 according to an embodiment of the disclosure may identify an object 50 included in a video 10. As an example, the processor 140 may identify at least one of the type or the model name of the object 50 included in the video 10. For example, the processor 140 may apply the video 10 to a learning network model and identify at least one of the type or the model name of the object 50 included in the video 10. As another example, the processor 140 can obviously obtain the type or the model name of the object 50 included in the video 10 from a user input.

Then, the processor 140 may identify functions that can be added, functions that can be removed, colors that can be selected, or materials that can be selected, etc. according to a user input based on information on the identified type or model name. Referring to FIG. 18, the processor 140 may identify a washing machine included in the video 10, and identify at least one of colors that can be selected or materials that can be selected based on information on the identified washing machine (e.g., the model name of the washing machine). Then, the processor 140 may apply at least one of the color or the material selected according to a user input to the object 50 and display the video 10.

Figure 19:
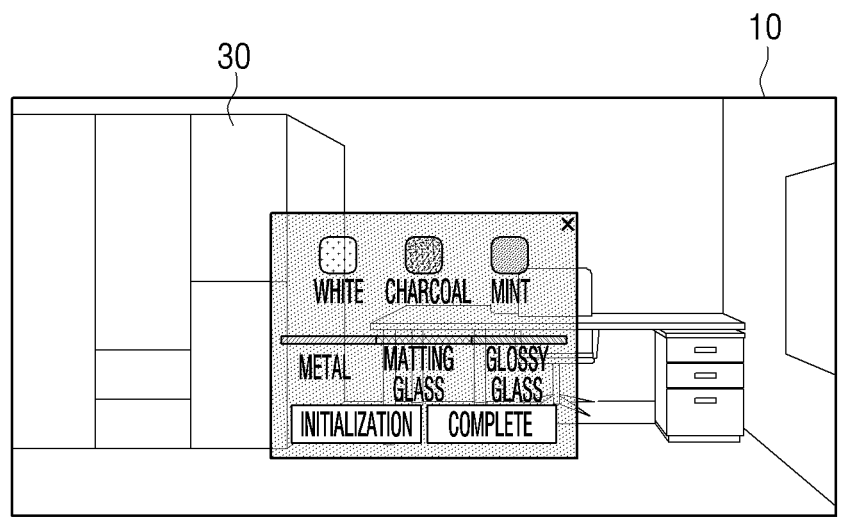
FIG. 19 is a diagram for illustrating a virtual object image according to another embodiment of the disclosure.

FIG. 19 is a diagram for illustrating a virtual object image according to another embodiment of the disclosure.

Referring to FIG. 19, the virtual object image 30 can obviously correspond to module-type furniture, an indoor wall surface, an interior accessory, houseware, etc. other than a module-type electronic device.

As an example, the processor 140 may obtain a virtual object image 30 corresponding to furniture wherein at least one of the size, the form, the color, or the material was defined according to a user input. Then, the processor 140 may add the virtual object image 30 to the video 10.

As another example, the processor 140 may identify a plurality of modules that can be selected based on information on module-type furniture. Here, a module may mean an independent component in a minimum unit that can perform a function as furniture, and module-type furniture may mean furniture including a single module or at least two modules. For example, a module-type cabinet of five columns may be furniture including five independent cabinets of one column. The processor 140 may obtain a virtual object image 30 corresponding to the module-type furniture including modules selected according to a user input among a plurality of modules.

Referring to FIG. 19, the processor 140 may obtain a virtual object image 30 corresponding to module-type furniture including first storage furniture to nth storage furniture selected according to a user input. Then, the processor 140 may provide a UI that can change the color or the material of each module.

Then, the processor 140 may add the virtual object image 30 to which the color or the material according to the user input was applied to the video 10, and provide the video 10. Here, the colors or the materials that can be selected by a user may be restrictive based on information on the module-type furniture. As an example, the processor 140 may receive information on module-type furniture from an external server, and the information on the module-type furniture may include information on a plurality of modules that can be selected in the module-type furniture, information on the colors that can be selected, information on the materials that can be selected, etc. The processor 140 may display only the colors or the materials that can be selected based on the information.

The processor 140 can obviously change the sizes or the arrangement form of the modules included in the module-type furniture according to a user input.

The processor 140 according to an embodiment of the disclosure may provide a function of requesting an order for module-type furniture. As an example, the processor 140 may add the virtual object image 30 to the video 10, and include an 'order' button within the video 10. If a user input for the button is received, the processor 140 may transmit information on the virtual object image 30 to an external server. Here, the external server may mean the manufacturer of the module-type furniture. It is obvious that the information on the virtual object image 30 can include the modules, the color, and the material selected according to a user input or the size, the arrangement form, etc. changed according to a user input.

Figure 2:
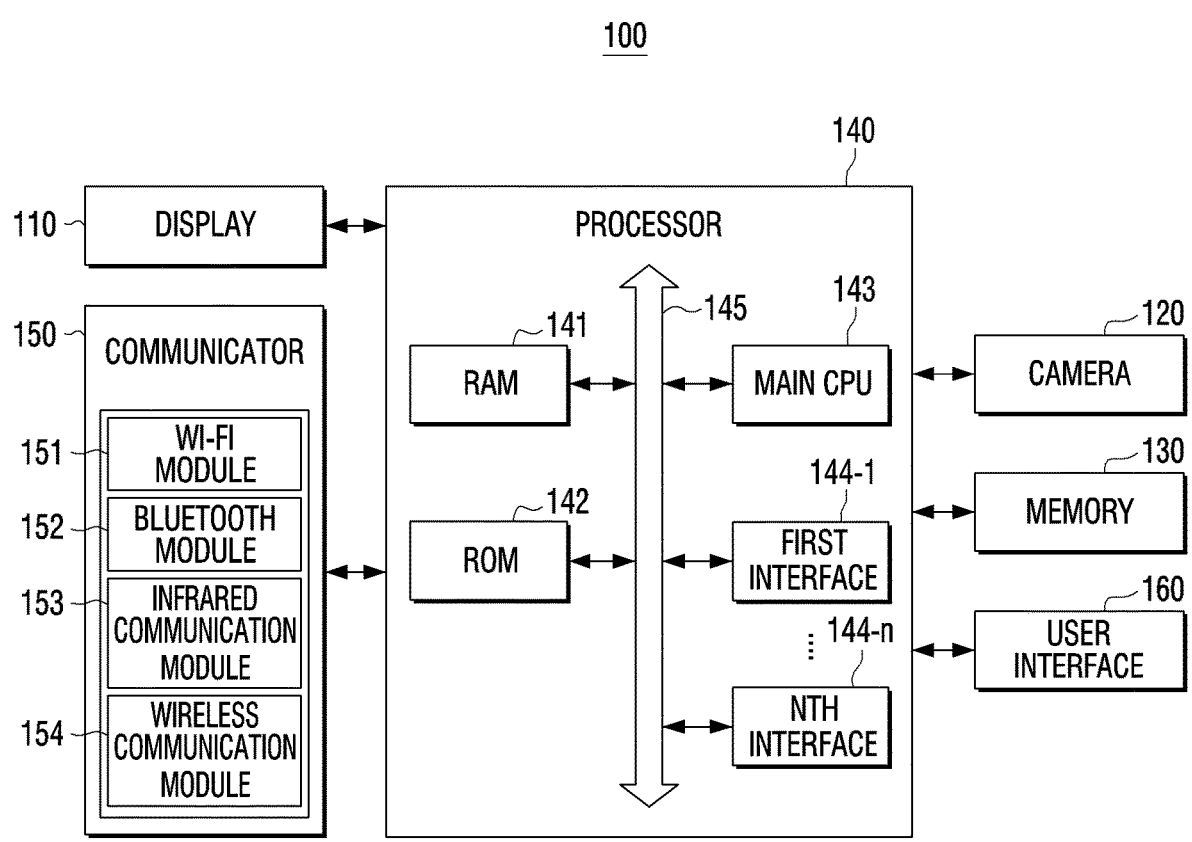
FIG. 2 is a block diagram illustrating a detailed configuration of the electronic device illustrated in FIG. 1.

FIG. 2 is a block diagram illustrating a detailed configuration of the electronic device illustrated in FIG. 1.

Referring to FIG. 2, the electronic device 100 according to an embodiment of the disclosure may include a display 110, a camera 120, a memory 130, a processor 140, a communicator 150, and a user interface 160. Among the components illustrated in FIG. 2, regarding components overlapping with the components illustrated in FIG. 1, detailed explanation will be omitted.

The memory 130 may be implemented as an internal memory such as a ROM (e.g., an electrically erasable programmable read-only memory (EEPROM)), a RAM, etc. included in the processor 140, or implemented as a separate memory from the processor 140. In this case, the memory 130 may be implemented in the form of a memory embedded in the electronic device 100, or implemented in the form of a memory that can be attached to or detached from the electronic device 100 according to the use of stored data. For example, in the case of data for driving the electronic device 100, the data may be stored in a memory embedded in the electronic device 100, and in the case of data for the extended function of the electronic device 100, the data may be stored in a memory that can be attached to or detached from the electronic device 100. Meanwhile, in the case of a memory embedded in the electronic device 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the electronic device 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The processor 140 controls the overall operations of the electronic device 100 by using various kinds of programs stored in the memory 130.

Specifically, the processor 140 includes a RAM 141, a ROM 142, a main CPU 143, first to nth interfaces 144-1 to 144-n, and a bus 145.

The RAM 141, the ROM 142, the main CPU 143, and the first to nth interfaces 144-1 to 144-n may be connected with one another through the bus 145.

In the ROM 142, a set of instructions for system booting, etc. are stored. When a turn-on instruction is input and power is supplied, the main CPU 143 copies the O/S stored in the memory 130 in the RAM 141 according to the instruction stored in the ROM 142, and boots the system by executing the O/S. When booting is completed, the main CPU 143 copies various kinds of application programs stored in the memory 130 in the RAM 141, and performs various kinds of operations by executing the application programs copied in the RAM 141.

The main CPU 143 accesses the memory 130, and performs booting by using the O/S stored in the memory 130. Then, the main CPU 143 performs various operations by using various kinds of programs, content data, etc. stored in the memory 130.

The first to nth interfaces 144-1 to 144-n are connected with the aforementioned various kinds of components. One of the interfaces may be a network interface connected with an external device through a network.

Meanwhile, the processor 140 may perform a graphic processing function (a video processing function). For example, the processor 140 may generate a screen including various objects like icons, images, and texts by using an operation part (not shown) and a rendering part (not shown). Here, the operation part (not shown) may operate attribute values such as coordinate values, shapes, sizes, and colors by which each object will be displayed according to the layout of the screen based on a received control command. Then, the rendering part (not shown) may generate screens in various layouts including objects, based on the attribute values operated at the operation part (not shown). Also, the processor 140 may perform various kinds of image processing such as decoding, scaling, noise filtering, frame rate conversion, and resolution conversion of video data.

Meanwhile, the processor 140 may perform processing for audio data. Specifically, at the processor 140, various kinds of processing such as decoding or amplification, noise filtering, etc. of audio data may be performed.

The communicator 150 is a component performing communication with various types of external devices according to various types of communication methods. The communicator 150 includes a Wi-Fi module 151, a Bluetooth module 152, an infrared communication module 153, and a wireless communication module 154, etc. Here, each module may be implemented in the form of at least one hardware chip.

The processor 140 may perform communication with various types of external devices by using the communicator

150. Here, external devices may include a display device like a TV, an image processing device like a set-top box, an external server, a control device like a remote control, an audio outputting device like a Bluetooth speaker, a lighting device, home appliances like a smart cleaner and a smart refrigerator, a server like an IoT home manager, etc.

The Wi-Fi module 151 and the Bluetooth module 152 perform communication by using a Wi-Fi method and a Bluetooth method, respectively. In the case of using the Wi-Fi module 151 and the Bluetooth module 152, various types of connection information such as an SSID and a session key is transmitted and received first, and connection of communication is performed by using the information, and various types of information can be transmitted and received thereafter.

The infrared communication module 153 performs communication according to an infrared Data Association (IrDA) technology of transmitting data to a near field wirelessly by using infrared rays between visible rays and millimeter waves.

The wireless communication module 154 may include at least one communication chip that performs communication according to various wireless communication protocols such as Zigbee, 3rd generation (3G), 3rd generation partnership project (3GPP), Long Term Evolution (LTE), LTE Advanced (LTE-A), 4th Generation (4G), 5th Generation (5G), etc. other than the aforementioned communication methods.

Other than the above, the communicator 150 may include at least one of a local area network (LAN) module, an Ethernet module, or a wired communication module performing communication by using a pair cable, a coaxial cable, or an optical fiber cable, etc.

According to an embodiment of the disclosure, the communicator 150 may use the same communication module (e.g., a Wi-Fi module) for communicating with an external device like a remote control and an external server.

According to another embodiment of the disclosure, the communicator 150 may use different communication modules (e.g., a Wi-Fi module) for communicating with an external device like a remote control and an external server. For example, the communicator 150 may use at least one of an Ethernet module or a Wi-Fi module for communicating with an external server, or use a BT module for communicating with an external device like a remote control. However, this is merely an example, and the communicator 150 may use at least one communication module among various communication modules in the case of communicating with a plurality of external devices or external servers.

The user interface 160 may be implemented as a device like a button, a touch pad, a mouse, and a keyboard, or as a touch screen that can perform both of the aforementioned display function and a manipulation input function. Here, a button may be various types of buttons such as a mechanical button, a touch pad, a wheel, etc. formed in any areas such as the front surface part or the side surface part, the rear surface part, etc. of the exterior of the main body of the electronic device 100.

The electronic device 100 according to an embodiment of the disclosure may include an input/output interface (not shown). The input/output interface may be the interface of any one of a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI).

The input/output interface may input and output at least one of an audio signal or a video signal.

Depending on implementation examples, the input/output interface may include a port inputting and outputting only audio signals and a port inputting and outputting only video signals as separate ports, or implemented as one port inputting and outputting both audio signals and video signals.

The electronic device 100 may be implemented as a device not including a display, and transmit an image signal to a separate display device.

Meanwhile, the electronic device 100 may receive a user voice signal from an external device including a microphone. In this case, the received user voice signal may be a digital voice signal, but depending on implementation examples, it may be an analog voice signal. As an example, the electronic device 100 may receive a user voice signal through wireless communication methods such as Bluetooth and Wi-Fi, etc. Here, an external device may be implemented as a remote control device or a smartphone.

The electronic device 100 may transmit a voice signal to an external server, for voice recognition of the voice signal received from an external device.

In this case, a communication module for communication with an external device and an external server may be implemented as one, or implemented as separate modules. For example, the communication module may communicate with an external device by using a Bluetooth module, and communicate with an external server by using an Ethernet modem or a Wi-Fi module.

Meanwhile, the electronic device 100 may further include a tuner and a demodulation part depending on implementation examples.

The tuner (not shown) may receive a radio frequency (RF) broadcast signal by tuning a channel selected by a user or all prestored channels in the RF broadcast signal received through an antenna.

The demodulation part (not shown) may receive a digital IF (DIF) signal converted at the tuner and demodulate the signal, and perform channel demodulation, etc.

The speaker (not shown) may be a component outputting not only various kinds of audio data processed at the input/output interface but also various kinds of notification sounds or voice messages, etc.

Meanwhile, the electronic device 100 may further include a microphone (not shown). The microphone is a component for receiving input of a user voice or other sounds and converting them into audio data.

The microphone (not shown) may receive a voice of a user in an activated state. For example, the microphone may be formed as an integrated type integrated to the upper side or the front surface direction, the side surface direction, etc. of the electronic device 100. The microphone may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

FIG. 20 is a flow chart for illustrating a control method of an electronic device according to an embodiment of the disclosure.

In a control method of an electronic device according to an embodiment of the disclosure, a video captured in real time through a camera is identified as a plurality of image sections, and spatial information corresponding to each of the plurality of image sections is obtained in operation S2010.

Then, the obtained spatial information is mapped to each of the plurality of image sections and is stored in operation S2020.

Then, if a user command for adding a virtual object image to the video is input, a virtual object image is added to the video based on the spatial information mapped to each of the plurality of image sections and is displayed in operation S2030.

Here, the storing operation S2020 may include operations of obtaining information on a plane space and information on a viewing direction of the camera in each of the plurality of image sections and storing the information on a plane space and the information on a viewing direction as the spatial information. The displaying operation S2030 includes the operations of obtaining location information for adding the virtual object image on the basis of the information on the plane space in each of the plurality of image sections, obtaining a virtual object image in a shape corresponding to the information on the viewing direction of the camera, and adding the obtained virtual object image to a corresponding image section and displaying the same on the basis of the location information.

In the operation of obtaining information on a viewing direction of the camera according to an embodiment of the disclosure, information on at least one of a location or a posture of the camera obtained through at least one of an acceleration sensor or a gyro sensor of the electronic device may be obtained as the information on the viewing direction of the camera.

The displaying operation S2030 according to an embodiment of the disclosure may include the operation of, based on a plurality of location information for adding the virtual object image on the basis of the spatial information obtained in at least one section among the plurality of image sections being obtained, identifying one of the plurality of location information on the basis of history information that a virtual object image was previously added to the video.

The control method according to an embodiment of the disclosure may include the operation of obtaining a video wherein the order of the plurality of image sections was rearranged on the basis of the information on the viewing direction obtained in each of the plurality of image sections, and in the displaying operation S2030, a navigation bar for adjusting a time point of reproducing the obtained video may be displayed together with the obtained video.

Here, in the operation of obtaining a video wherein the order of the plurality of image sections was rearranged, the order of the plurality of image sections may be rearranged such that the viewing direction of the camera moves from a first direction to a second direction on the basis of the information on the viewing direction.

The control method according to an embodiment of the disclosure may include the operation of transmitting the plurality of image sections and spatial information mapped to each of the plurality of image sections to an external device.

Also, the displaying operation S2030 may include the operation of, based on a video to which another virtual object image was added on the basis of the plurality of image sections and the spatial information mapped to each of the plurality of image sections being received from the external device, replacing the virtual object image with the another virtual object image included in the received video and displaying the same.

The virtual object image according to an embodiment of the disclosure may be a virtual object image corresponding to the spatial information among a plurality of virtual object images which captured a 3D object image in different directions or different distances.

Here, the displaying operation S2030 may include the operations of, based on a user command for at least one of change of the location or rotation of the virtual object image included in the video being input, obtaining at least one of direction information or distance information corresponding to the user command, obtaining a virtual object image corresponding to the user command among the plurality of virtual object images on the basis of the obtained information and displaying the same.

The storing operation S2020 according to an embodiment of the disclosure may include the operation of obtaining information on an object included in each of the plurality of image sections and storing the same as the spatial information, and the displaying operation S2030 may include the operations of obtaining location information for adding the virtual object image to one area of the object on the basis of the information on the object in each of the plurality of image sections, and obtaining the virtual object image in a shape corresponding to the information on the viewing direction of the camera, and adding the obtained virtual object image to a corresponding image section and displaying the same on the basis of the location information.

The storing operation S2020 according to an embodiment of the disclosure may include the operation of obtaining information on an object included in each of the plurality of image sections and shape information of a space wherein the object is located and storing the same as the spatial information, and in the displaying operation S2030, if a user command for replacing the object with the virtual object is input, the virtual object image may be overlapped with the object on the basis of the information on the object and the shape information of the space and displayed.

Here, the control method according to an embodiment of the disclosure may include the operation of applying the video to a learning network model and obtaining information on an object included in each of the plurality of image sections, and the information on the object may include at least one of the type, the shape, the size, or the location of the object.

Also, in the displaying operation S2030, if a user command for adding another virtual object image to one area of the virtual object image is input, the display may be controlled to display the another virtual object image in a form of being laminated on the virtual object image on the basis of information on the virtual object image. In addition, the control method according to an embodiment of the disclosure may include the operations of, based on a command for removing the virtual object image being input, removing the virtual object image, and displaying the another virtual object image in the location wherein the virtual object image was removed.

Meanwhile, the methods according to the aforementioned various embodiments of the disclosure may be implemented in forms of applications that can be installed on conventional electronic devices.

Also, the methods according to the aforementioned various embodiments of the disclosure may be implemented only with software upgrade, or hardware upgrade of conventional electronic devices.

In addition, the aforementioned various embodiments of the disclosure can be performed through an embedded server provided on an electronic device, or an external server of at least one of an electronic device or a display device.

Meanwhile, according to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, a method according to the aforementioned various embodiments may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

In addition, each of the components (e.g.: a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g.: modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a display;
a camera; and
a processor configured to:
obtain video through the camera,
divide, by at least a single frame, a plurality of frames of a source video captured through the camera into a plurality of image sections,
obtain spatial information corresponding to an image section that is currently being output through the display from among the plurality of image sections,
identify a plane space and a view direction of the camera based on the obtained spatial information,
obtain an input for arranging a virtual object image in the identified plane space and the view direction of the camera, and
control the display to display a video wherein the virtual object image is arranged in the plane space and rotated to correspond to the view direction of the camera,
wherein the processor rearranges an order of the plurality of image sections so that the view direction of the camera according to reproduction of the video moves from a first direction to a second direction, and controls the display to display a navigation bar for selecting each of the plurality of rearranged image sections, and
wherein a form of the navigation bar corresponds to directivity of moving from the first direction to the second direction.

2. The electronic device of claim 1,
wherein the processor is further configured to:
acquire information on at least one of a location and a pose of the camera obtained through at least one of an acceleration sensor and a gyro sensor as information on the view direction of the camera.

3. The electronic device of claim 1,
wherein the processor is further configured to:
based on a plurality of plane spaces being identified based on spatial information corresponding to the image section among the plurality of image sections, identify at least one plane space wherein the virtual object image was previously arranged among the plurality of plane spaces based on history information, and
provide the video wherein the virtual object image is arranged in the identified at least one plane space.

4. The electronic device of claim 1, further comprising:
a communicator,
wherein the processor is further configured to:
control the communicator to transmit the video and the spatial information respectively corresponding to the plurality of image sections to an external device.

5. The electronic device of claim 4,
wherein the processor is further configured to:
based on receiving information on another virtual object image from the external device, control the display to display a video wherein the another virtual object image is arranged in the identified plane space based on the information on the another virtual object image.

6. The electronic device of claim 1,
wherein the processor is further configured to:
adjust a 3D object image to correspond to at least one of a distance between the plane space and the electronic device and the view direction of the camera for the plane space, and
arrange the adjusted 3D object image in the plane space as the virtual object image.

7. The electronic device of claim 6,
wherein the processor is further configured to:
based on a user command for changing at least one of size, location, and direction of the virtual object image being input, change the size of the virtual object image, change the location of the virtual object image in the video, or rotate the virtual object image based on the user command.

8. The electronic device of claim 1,
wherein the processor is further configured to:

identify another object included in at least one other section based on spatial information corresponding to the at least one other image section among the plurality of image sections, identify another plane space based on the identified another object, and control the display to display the video wherein the virtual object image is rotated to correspond to the view direction of the camera and is arranged in the plane space on the identified object.

9. The electronic device of claim 1,
wherein the processor is further configured to:
identify an object included in the image section based on spatial information corresponding to the image section, and based on an input for replacing the identified object with the virtual object image being obtained, control the display to display a video wherein the virtual object image is arranged to be overlapped with the identified object.

10. The electronic device of claim 1,
wherein the processor is further configured to:
apply the video to a learning network model and obtain information on an object included in the plurality of image sections, and the information on the object includes at least one of type, shape, size and location of the object.

11. The electronic device of claim 1,
wherein the processor is further configured to:
based on an input for additionally arranging another virtual object image in one area on the virtual object image being obtained, identify another plane space of the virtual object image, and control the display to display a video wherein the another virtual object image is arranged to be laminated on the another plane space of the virtual object image.

12. The electronic device of claim 11,
wherein the processor is further configured to:
based on an input for removing the virtual object image being obtained, remove the virtual object image, and control the display to display a video wherein the another virtual object image is arranged in the identified plane space based on the obtained spatial information.

13. The electronic device of claim 1,
wherein the processor is configured to:
based on a plurality of plane spaces being identified based on spatial information corresponding to the image section among the plurality of image sections, identify the plane space based on which of the plurality of plane spaces has a largest area.

14. The electronic device of claim 1,
wherein the processor is configured to:
based on a plurality of plane spaces being identified based on spatial information corresponding to the image section among the plurality of image sections, identify the plane space based on which of the plurality of plane spaces is located at a height greater than or equal to a threshold value based on a floor plane.

15. A method of controlling an electronic device including a display and a camera, the method comprising:
obtaining video through the camera,
dividing, by at least a single frame, a plurality of frames of a video captured through the camera into a plurality of image sections,
obtaining spatial information corresponding to an image section that is currently being output through the display from among the plurality of image sections,
identifying a plane space and a view direction of the camera based on the obtained spatial information,
obtaining an input for arranging a virtual object image in the identified plane space and the view direction of the camera, and
displaying a video wherein the virtual object image is arranged in the plane space and rotated to correspond to the view direction of the camera,
wherein the method further comprises:
rearranging an order of the plurality of image sections so that the view direction of the camera according to reproduction of the video moves from a first direction to a second direction, and
controlling the display to display a navigation bar for selecting each of the plurality of rearranged image sections, and
wherein a form of the navigation bar corresponds to directivity of moving from the first direction to the second direction.

16. A non-transitory computer readable recording medium storing a program which is executable by a processor to perform a method for controlling an electronic device that includes a display and a camera, the method comprising:
obtaining video through the camera,
dividing, by at least a single frame, a plurality of frames of a video captured through the camera into a plurality of image sections,
obtaining spatial information corresponding to an image section that is currently being output through the display from among the plurality of image sections,
identifying a plane space and a view direction of the camera based on the obtained spatial information,
obtaining an input for arranging a virtual object image in the identified plane space and the view direction of the camera, and
displaying a video wherein the virtual object image is arranged in the plane space and rotated to correspond to the view direction of the camera,
wherein the method further comprises:
rearranging an order of the plurality of image sections so that the view direction of the camera according to reproduction of the video moves from a first direction to a second direction, and
controlling the display to display a navigation bar for selecting each of the plurality of rearranged image sections, and
wherein a form of the navigation bar corresponds to directivity of moving from the first direction to the second direction.

* * * * *